(12) United States Patent
Pandolfino et al.

(10) Patent No.: US 12,444,162 B2
(45) Date of Patent: Oct. 14, 2025

(54) ANALYSIS TOOL FOR PERFORMING PATIENT-SPECIFIC ANALYSIS OF FLOWS THROUGH FLEXIBLE TUBULAR ORGANS

(71) Applicant: Northwestern University, Evanston, IL (US)

(72) Inventors: John Erik Pandolfino, Wilmette, IL (US); Neelesh Ashok Patankar, Buffalo Grove, IL (US); Sourav Halder, Evanston, IL (US); Shashank Acharya, Evanston, IL (US); Peter James Kahrilas, Chicago, IL (US)

(73) Assignee: Northwestern University, Evanston, IL (US)

( * ) Notice: Subject to any disclaimer, the term of this patent is extended or adjusted under 35 U.S.C. 154(b) by 591 days.

(21) Appl. No.: 17/779,124

(22) PCT Filed: Nov. 23, 2020

(86) PCT No.: PCT/US2020/061875
§ 371 (c)(1),
(2) Date: May 23, 2022

(87) PCT Pub. No.: WO2021/102436
PCT Pub. Date: May 27, 2021

(65) Prior Publication Data
US 2022/0405923 A1 Dec. 22, 2022

Related U.S. Application Data

(60) Provisional application No. 62/939,085, filed on Nov. 22, 2019.

(51) Int. Cl.
*G06V 10/44* (2022.01)
*G06T 3/40* (2006.01)
(Continued)

(52) U.S. Cl.
CPC .............. *G06V 10/454* (2022.01); *G06T 3/40* (2013.01); *G06T 7/0012* (2013.01); *G06T 7/11* (2017.01);
(Continued)

(58) Field of Classification Search
CPC ........ G06V 10/454; G06V 10/82; G06T 3/40; G06T 7/0012; G06T 7/11; G06T 7/20;
(Continued)

(56) References Cited

U.S. PATENT DOCUMENTS 8,315,812 B2 * 11/2012 Taylor .................... A61B 5/055
382/128
2014/0343415 A1 11/2014 Hoffman et al.
(Continued)

OTHER PUBLICATIONS

Li M, Brasseur JG, Dodds WJ (1994) Analyses of normal and abnormal esophageal transport using computer simulations. American Journal of Physiology-Gastrointestinal and Liver Physiology 266(4):G525-G543, DOI 10.1152/ajpgi.1994.266.4.G525.
(Continued)

*Primary Examiner* — Juan A Torres
(74) *Attorney, Agent, or Firm* — Quarles & Brady LLP

(57) ABSTRACT

Flow through tubular organs (e.g., the esophagus) is analyzed based on fluid mechanics analysis of medical images. Using computational fluid dynamics, a reduced-order model is constructed and implemented to predict flow rate and fluid pressure developed inside flexible tubular organs inside the body. As one non-limiting example, the constructed model can be applied to analyze esophageal transport using fluoroscopy image sequences to predict flow rate, pressure, esophagus wall stiffness, and active relaxation.

19 Claims, 12 Drawing Sheets

(51) Int. Cl.
  *G06T 7/00* (2017.01)
  *G06T 7/11* (2017.01)
  *G06T 7/20* (2017.01)
  *G06V 10/82* (2022.01)
  *G16H 15/00* (2018.01)
  *G16H 30/40* (2018.01)

(52) U.S. Cl.
  CPC ............... *G06T 7/20* (2013.01); *G06V 10/82* (2022.01); *G16H 15/00* (2018.01); *G16H 30/40* (2018.01); *G06T 2207/10064* (2013.01); *G06T 2207/20081* (2013.01); *G06T 2207/20084* (2013.01); *G06T 2207/30092* (2013.01)

(58) Field of Classification Search
  CPC . G06T 2207/10064; G06T 2207/20081; G06T 2207/20084; G06T 2207/30092; G16H 15/00; G16H 30/40; G06F 18/24133
  USPC ......................................................... 382/128
  See application file for complete search history.

(56) References Cited

U.S. PATENT DOCUMENTS

| | | | |
|---|---|---|---|
| 2018/0078139 | A1 | 3/2018 | Sanders et al. |
| 2019/0038208 | A1* | 2/2019 | Mohammadi ........ A61B 5/4205 |
| 2019/0130575 | A1* | 5/2019 | Chen ........................ G06N 3/08 |
| 2019/0197662 | A1 | 6/2019 | Sloan et al. |
| 2020/0294241 | A1* | 9/2020 | Wu ........................... G06T 7/11 |

OTHER PUBLICATIONS

Iglovikov, V. and Shvets, A. TernausNet: U-Net with VGG11 Encoder Pre-Trained on ImageNet for Image Segmentation., Jan. 2018.
Barnard AL, Hunt W, Timlake W, Varley E (1966) A theory of fluid flow in compliant tubes. Biophysical Journal 6(6):717-724, DOI https://doi.org/10.1016/S0006-3495(66)86690-0.
Brasseur JG (1987) A fluid mechanical perspective on esophageal bolus transport. Dysphagia 2(1):32, DOI 10.1007/BF02406976.
Ciresan D, Giusti A, Gambardella LM, Schmidhuber J (2012) Deep neural networks segment neuronal membranes in electron microscopy images. In: Pereira F, Burges CJC, Bottou L, Weinberger KQ (eds) Advances in Neural Infor-mation Processing Systems 25, Curran Associates, Inc., pp. 2843-2851.
Coleman GB, Andrews HC (1979) Image segmentation by clustering. Proceedings of the IEEE 67(5):773-785, DOI 10.1109/PROC. 1979.11327.
Ghosh SK, Kahrilas PJ, Zaki T, Pandolfino JE, Joehl RJ, Brasseur JG (2005) The mechanical basis of impaired esophageal emptying post fundoplication. Am J Physiol Gastrointest Liver Physiol 289:G21G35, DOI 10.1152/ajpgi.00235.2004.
International Search Report, corresponding to PCT/US2020/061875, dated Feb. 25, 2021.
Jacob P, Kahrilas P, Logemann J, Shah V, Ha T (1989) Upper esophageal sphincter opening and modulation during swallowing. Gastroenterology 97(6):1469-1478, DOI https://doi.org/10.1016/0016-5085(89)90391-0.
Kamm RD, Shapiro AH (1979) Unsteady flow in a collapsible tube subjected to external pressure or body forces. Journal of Fluid Mechanics 95(1):178, DOI 10.1017/S0022112079001348.
Kayalibay B, Jensen G, van der Smagt P (2017) Cnn-based segmentation of medical imaging data. CoRR abs/1701.03056, 1701.03056.
Kou W, Bhalla A, Griffith B, Pandolfino J, Kahrilas P, Patankar N (2015) A fully resolved active musculo-mechanical model for esophageal transport. Journal of Computational Physics 298:446-465, DOI 10.1016/j.jcp. 2015.05.049.
Kou W, Griffith BE, Pandolfino JE, Kahrilas PJ, Patankar NA (2017) A continuum mechanics-based musculo-mechanical model for esophageal transport. Journal of Computational Physics 348:433-459, DOI https://doi.org/10.1016/j.jcp.2017.07.025.
Kwiatek MA, Hirano I, Kahrilas PJ, Rothe J, Luger D, Pandolfino JE (2011) Mechanical properties of the esophagus in eosinophilic esophagitis. Gastroenterology 140(1):82-90, DOI https://doi.org/10.1053/j.gastro.2010.09.037.
Lang IM, Shaker R (1997) Anatomy and physiology of the upper esophageal sphincter. The American Journal of Medicine 103(5, Supplement 1):50S-55S, DOI https: //doi.org/10.1016/S0002-9343(97)00323-9.
Li M, Brasseur JG (1993) Non-steady peristaltic transport in finite-length tubes. Journal of Fluid Mechanics 248:129151, DOI 10.1017/S0022112093000710.
Manopoulos CG, Mathioulakis DS, Tsangaris SG (2006) One-dimensional model of valveless pumping in a closed loop and a numerical solution. Physics of Fluids 18(1):017,106, DOI 10.1063/1.2165780.
Mittal R (2011) Motor function of the pharynx, esophagus, and its sphincters. Colloquium Series on Integrated Systems Physiology: From Molecule to Function 3(3):1-84, Doi 10.4199/C00027ED1V01Y201103ISP016, https: //doi.org/10.4199/C00027ED1V01Y201103ISP016.
Ottesen J (2003) Valveless pumping in a fluid-filled closed elastic tube-system: one-dimensional theory with ex-perimental validation. Journal of Mathematical Biology 46(4):309-332, DOI 10.1007/s00285-002-0179-1.
Pal NR, Pal SK (1993) A review on image segmentation techniques. Pattern Recognition 26(9):1277-1294, DOI https://doi.org/10.1016/0031-3203(93)90135-J.
Pham DL, Xu C, Prince JL (2000) Current methods in medical image segmentation. Annual Review of Biomedical Engineering 2(1):315-337, DOI 10.1146/annurev.bioeng. 2.1.315, pMID: 11701515.
Ronneberger O, Fischer P, Brox T (2015) U-net: Convolutional networks for biomedical image segmentation. CoRR abs/1505.04597, 1505.04597.
Sahoo P, Soltani S, Wong A (1988) A survey of thresholding techniques. Computer Vision, Graphics, and Image Processing 41(2):233-260, DOI https://doi.org/10.1016/ 0734-189X(88)90022-9.
Senthilkumar R, Bharathi A, Sowmya B, Sugunamuki K (2018) Image segmentation edge detection techniques using—soft computing approaches. pp. 1-6, DOI 10.1109/ICSNS.2018.8573678.
Sharma N, Aggarwal L (2010) Automated medical image segmentation techniques. Journal of Medical Physics 35(1):3-14, DOI 10.4103/0971-6203.58777.
Xia F, Mao J, Ding J, Yang H (2009) Observation of normal appearance and wall thickness of esophagus on ct images. European Journal of Radiology 72(3):406-411, DOI https://doi.org/10.1016/j.ejrad.2008.09.002.
Yang W, Fung TC, Chian KS, Chong CK (2007) Finite element simulation of food transport through the esophageal body. World journal of gastroenterology 13(9):13521359, DOI 10.3748/wjg.v13.i9.1352.

* cited by examiner

ANALYSIS TOOL FOR PERFORMING PATIENT-SPECIFIC ANALYSIS OF FLOWS THROUGH FLEXIBLE TUBULAR ORGANS

CROSS-REFERENCE TO RELATED APPLICATIONS

This application represents the national stage entry of PCT/US2020/061875 filed on Nov. 23, 2020, which claims the benefit U.S. Provisional Patent Application Ser. No. 62/939,085, filed on Nov. 22, 2019, and entitled "ANALYSIS TOOL FOR PERFORMIGN PATEINT-SPECIFIC ANALYSIS OF FLOWS THROUGH FLEXIBLE TUBULAR ORGANS," which is herein incorporated by reference in their entireties.

STATEMENT REGARDING FEDERALLY SPONSORED RESEARCH

This invention was made with government support under DK079902 and DK 117824 awarded by the National Institutes of Health and under ACI-1450374 awarded by the National Science Foundation. The government has certain rights in the invention.

BACKGROUND

Diagnosing esophageal disorders through medical imaging include barium swallow esophagram and video fluoroscopy swallowing exam (VFSE). Both esophagram and VFSE are minimally invasive radiologic tests but provide only qualitative information about the state of the esophagus. Previous studies using information from fluoroscopy for analysis with fluid mechanics provide important insights about the esophageal transport and mechanisms of various disorders, but significant time and effort is required to obtain the shape of the bolus from the fluoroscopy images manually and then perform analysis based on this geometry. Therefore, the use of these methods for clinical applications is limited.

SUMMARY OF THE DISCLOSURE

The present disclosure addresses the aforementioned drawbacks by providing a method for analyzing flow through a tubular organ of a subject. Medical image data are accessed with a computer system. The medical image data are acquired from the subject using a medical imaging system, and depict transport of a bolus through a tubular organ of the subject. Segmented medical image data are generated by segmenting the medical image data in order to segment the bolus as it is transported through the tubular organ of the subject. Flow analysis data are generated by inputting the segmented medical image data to a reduced-order model, generating output as the flow analysis data. The flow analysis data include at least one of flow rate data, pressure field data, wall stiffness data, or relaxation data.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTION OF THE DRAWINGS

FIGS. 3A-3E show fluoroscopy images depicting bolus transported from the proximal to the distal end of the esophagus and emptying in to the stomach, FIGS. 3F-3J show the corresponding image segmentation, and FIGS. 3K-3O show the corresponding outline of the esophagus lumen for analysis.

FIG. 7A shows an example of volume measured inside the esophagus. FIG. 7B shows a schematic diagram of shape modification for volume conservation. FIG. 7C shows an example ratio map of major and minor axes.

FIG. 9A shows a reference model with relaxation and FIG. 9B shows a reference model without relaxation.

FIG. 10A shows a plot of the variation of the center of the bolus with time. FIG. 10B shows the variation of area with z for all x and t. FIG. 10C shows an example of pressure calculated using a reference model formulation with constant bolus shape. FIG. 10D shows an example of wall stiffness calculated using a reference model formulation with constant bolus shape.

FIG. 11A shows an example of minimum stiffness at every location along the length of the esophagus. FIG. 11B shows an example of relaxation of the esophageal walls.

DETAILED DESCRIPTION

Figure 1:
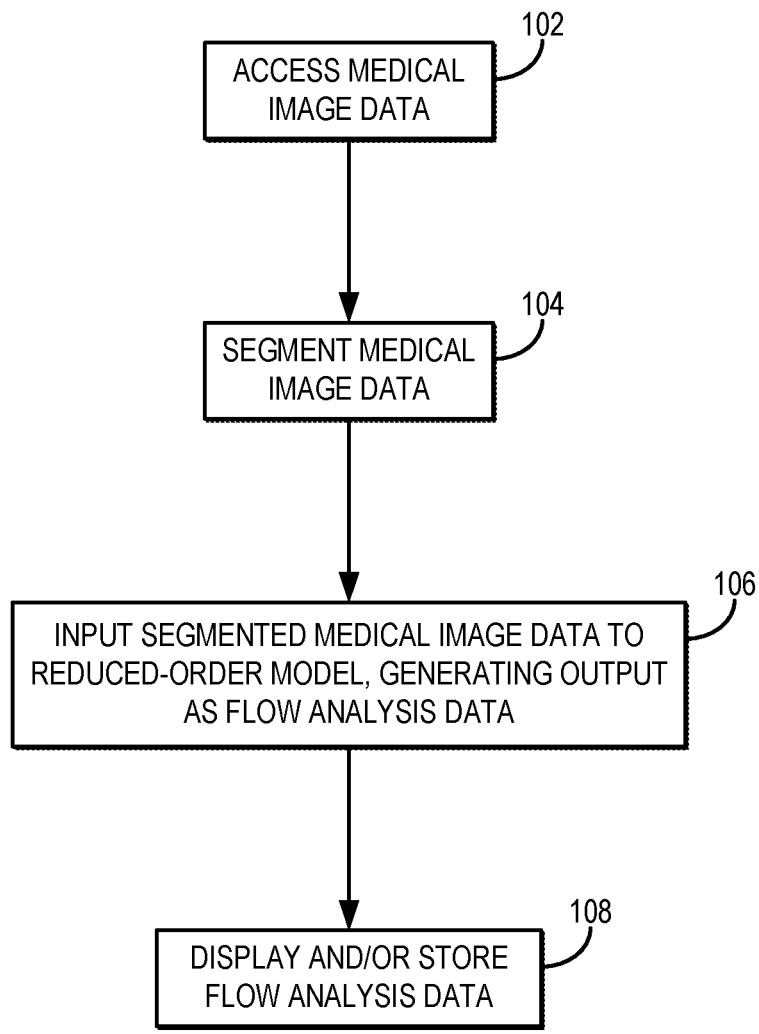
FIG. 1 is a flowchart setting forth the steps of an example method for analyzing flow through tubular organs (e.g., the esophagus) based on fluid mechanics analysis of medical images.

Described herein are systems and methods for analyzing flow through tubular organs (e.g., the esophagus) based on deep learning and fluid mechanics analysis of medical images. Using deep learning and computational fluid dynamics, a model is constructed and implemented to predict flow rate and fluid pressure developed inside flexible tubular organs inside the body. As one non-limiting example, the constructed model can be applied to analyze esophageal transport using fluoroscopy image sequences to predict flow rate, pressure, esophagus wall stiffness, and active relaxation.

In one aspect, the systems and methods described in the present disclosure can implement deep learning to perform automatic segmentation of image sequences from fluoroscopy or other medical imaging modalities, thereby providing an advantage of a faster and more convenient implementation. These segmented images can be used as input to a reduced-order model that predicts the fluid flow rate, pressure, esophagus wall properties, and active relaxation. The analysis described in the present disclosure requires very little input from a user and takes only a few minutes to run. Therefore, these systems and methods can be used for clinical applications, particularly to aid video fluoroscopy swallowing exam ("VFSE") and provide a minimally invasive diagnosis tool for esophageal disorders.

As noted, the systems and methods described in the present disclosure can be used together with fluoroscopy and other medical imaging modalities to provide additional information, including flow rate/velocity and the fluid pressure inside the esophagus during bolus transport. In some aspects, stiffness and active relaxation of the esophagus wall can also be estimated. These parameters can be used as new physio-markers to diagnose esophageal disorders, which may not otherwise be estimated by any imaging techniques. The method can be readily extended to other kinds of medical imaging like CT, MRI, and so on. The systems and methods can also be used with any tubular organ in the body where medical imaging is utilized to diagnose disorders, like blood vessels, trachea, and so on.

Barium swallow esophagram/fluoroscopy is a popular diagnosis tool for esophageal disorders that provides a visual idea about the quality of transport through the esophagus. The systems and methods described in the present disclosure enhance the capability of a barium swallow test by providing quantitative information about the flow-like velocity and pressure with minimal extra effort by the user. Further, the systems and methods can be easily adapted for use with other imaging modalities, such as CT and MRI, which can suffer from the same limitation of lack of quantitative information about flow.

Manometry (which measures pressure inside the esophagus) is often accompanied with fluoroscopy. Therefore, the systems and methods described in the present disclosure can be implemented in conjunction with software that analyzes manometry data (e.g., esophageal pressure topography) to give additional information about the bolus transport. Because the analyses described in the present disclosure do not require high computational resources, they can be easily used for clinical applications.

Devices used for performing fluoroscopy, manometry, CT, or MRI can extend their capabilities by incorporating the technique described in the present disclosure without significant investment on hardware. The systems and methods described in the present disclosure can also calculate material properties as well as active relaxation of the esophagus wall, which are more fundamental physio-markers compared to pressure (which is the current standard to measure the state of the esophagus).

Barium swallow test/fluoroscopy only shows the shape of the bolus, thus providing only qualitative information about the transport. The systems and methods described in the present disclosure augment this information to provide quantitative information about the flow rate/velocity and pressure inside the esophagus. Other diagnosing methods like high resolution manometry provide quantitative information about the esophagus in terms of pressure developed inside the esophagus, but are invasive tests. Because the techniques described in the present disclosure take medical image data as an input, they are minimally invasive.

Referring now to FIG. 1, a flowchart is illustrated as setting forth the steps of an example method for analyzing flow through tubular organs (e.g., the esophagus) based on fluid mechanics analysis of medical images of a subject. The method includes accessing medical image data with a computer system, as indicated at step 102. Accessing the medical image data can include retrieving previously acquired data from a memory or other suitable data storage device or medium, or as another example can include acquiring such data with a medical imaging system and transferring or otherwise communicating the data to the computer system, which in some implementations may be a part of the medical imaging system.

The medical image data may include one or more medical images. As one example, the medical image data can include x-ray images that are acquired with a fluoroscopy system. As another example, the medical image data can include images acquired with a magnetic resonance imaging ("MRI") system, a computed tomography ("CT") system, an ultrasound system, or another suitable medical imaging system.

The medical image data are then segmented in order to generate an outline of the bolus during transport through the esophagus or other tubular organ, as indicated at step 104. As one example, the medical image data can be segmented using a suitably trained machine learning algorithm. In other examples, the medical image data can be segmented using other suitable image segmentation methods, including thresholding-based methods, region growing-based methods, clustering-based methods, and/or edge detection-based methods.

Thus, in some implementations, the medical image data can be segmented by inputting the medical image data to a trained machine learning algorithm, generating output as segmented medical image data. As one non-limiting example, the trained machine learning algorithm can be an artificial neural network, such as a convolutional neural network or a residual neural network. The machine learning algorithm can be trained on training data that may include labeled medical image data that include medical images that have been segmented either manually or using other semi-automated or automated segmentation methods in order to label regions in the images that are associated with a bolus during transport through the esophagus or other tubular organ.

Figure 2:
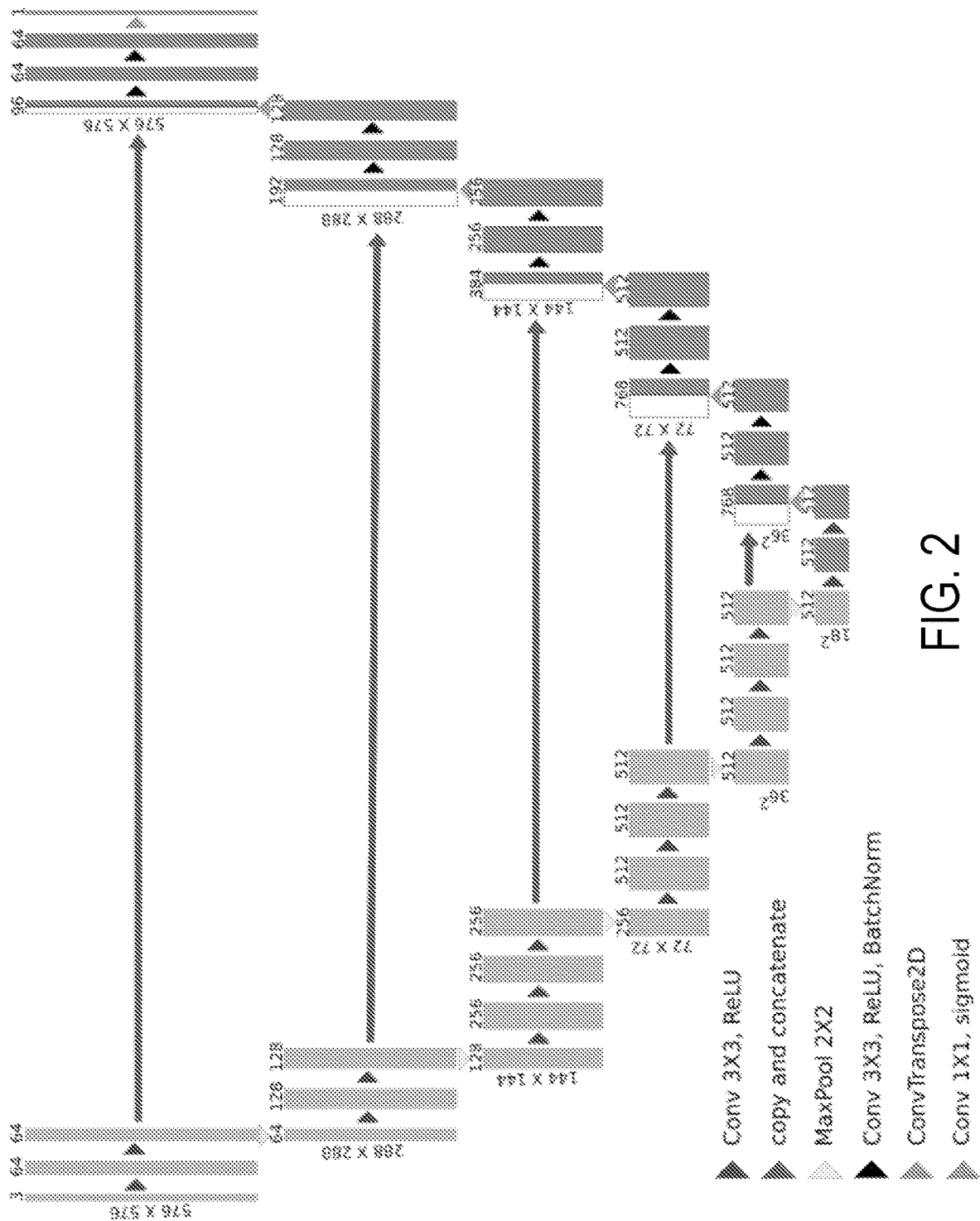
FIG. 2 shows an example neural network architecture (based on TernausNet) that can be trained for generating segmented medical image data. The feature maps in the encoder path represent a VGG16 encoder pre-trained with the ImageNet dataset.
Figures 3A, 3O:
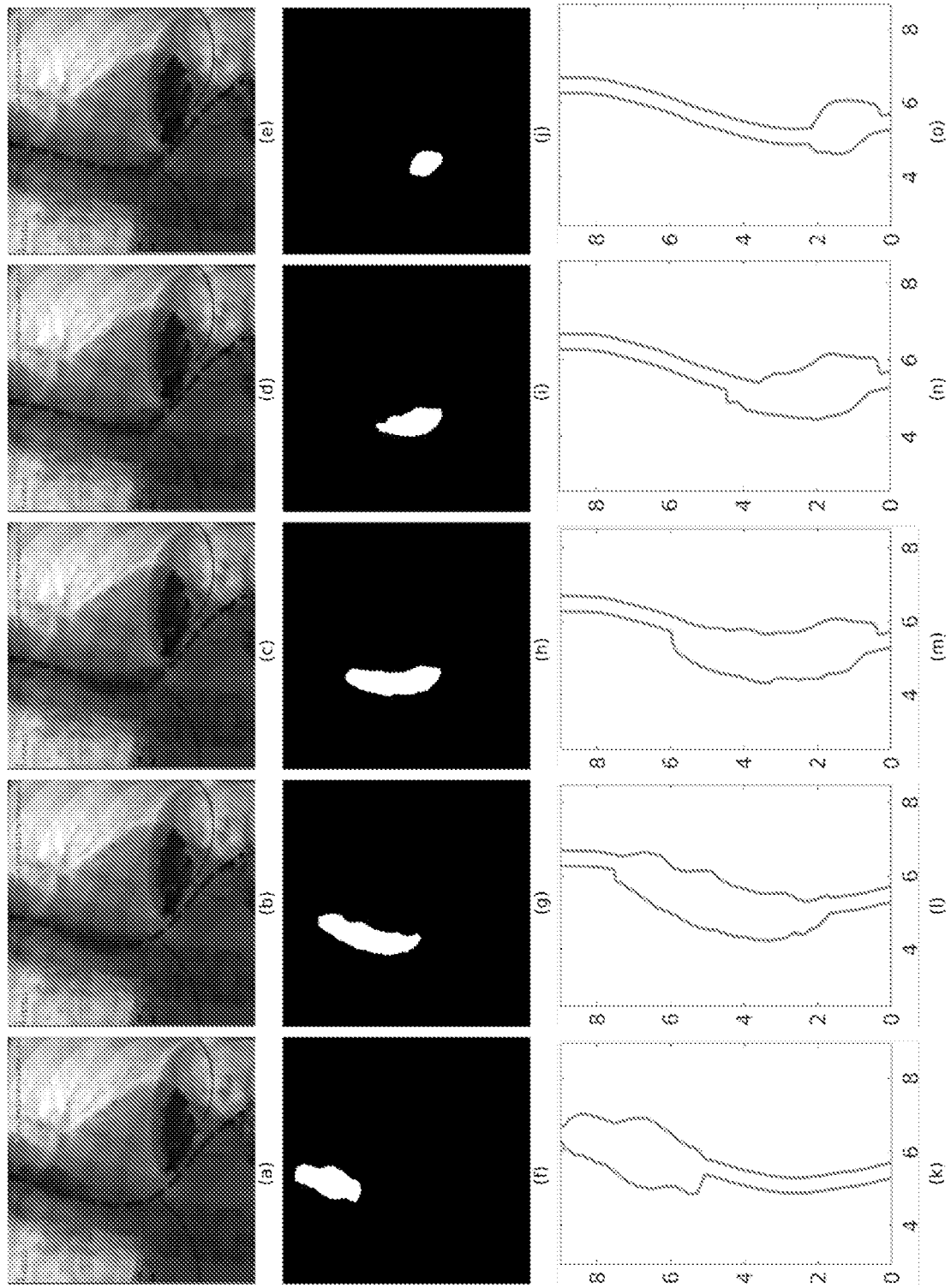
FIGS. 3A-3O show an example of the segmentation of image frames of a fluoroscopy image series.

As one non-limiting example, a convolutional neural network architecture called TernausNet can be used to perform image segmentation. TernausNet is a modified form of a classical U-Net, which includes of an encoder and decoder path with skip connections that combine feature maps from the encoder and decoder paths leading to precise localization. TernausNet takes advantage of transfer learning by replacing the encoder part of U-Net with a VGG11/VGG16 network pretrained on an ImageNet data set, which contains millions of images. Therefore, the low level features learnt from a huge dataset can be efficiently utilized and the total number of parameters to be learnt is reduced significantly. In the example network architecture shown in FIG. 2, the TernausNet implements an encoder path that includes a VGG16 architecture. The decoder path is similar to that of the original TernausNet with a slight modification of having two sets of convolution (e.g., Conv 3×3) and nonlinear (e.g., ReLU) layers at each level instead of one. In order to prevent over-fitting, batch normalization can be used after every convolution layer in the decoder path.

In one example implementation, the neural network can be trained using a data set that includes a number of different images of the tubular organ (e.g., the esophagus) that are manually segmented for labeling. For instance, 136 esophagram images from 99 swallows (from 14 different patients) showing different instants of the transport process were used in one example study to train a neural network for segmenting medical image data. These esophagram images were obtained from flouroscopy videos associated with high-resolution manometry measurements. The images were manually segmented for labeling. Because this particular training set was relatively small, transfer learning can be used through the pretrained encoder in order to prevent over-fitting. Additionally or alternatively, various image augmentations such as rotation, height and width shifts, varying brightness, shearing, piecewise affine, and scaling can also be implemented. These augmentations can be applied randomly with varying extents, an example range of which is provided in Table 1.

TABLE 1

Details of Data Augmentation

| Augmentation Type | Range Min | Range Max |
| --- | --- | --- |
| Rotation | −10.0° | 10.0° |
| Width shift | −10% | 10% |
| Height shift | −10% | 10% |
| Brightness | 50% | 150% |
| Shear | −5° | 5° |
| Zoom | 80% | 120% |
| Piecewise affine | 0 | 0.03 |

These augmentations can be implemented to reduce over-fitting when a smaller training data set is used, and also to introduce generalizability into the machine learning model.

The training dataset of images can be divided in two parts: images for training and images for validation. Because the segmentation of medical images in this application is a semantic segmentation problem, where each pixel belongs to one of two classes (1 for bolus and 0 for the background), a combination of binary cross-entropy ("BCE") and intersection over union ("IOU") loss functions, defined as follows, can be used for training:

$$BCE = -\frac{1}{N}\sum_{i=1}^{N}(y_i \log(\hat{y}_i) + (1 - y_i)\log(1 - \hat{y}_i)); \quad (1)$$

$$IOU = -\frac{1}{N}\sum_{i=1}^{N}\frac{y_i\hat{y}_i + \varepsilon}{y_i + \hat{y}_i - y_i\hat{y}_i + \varepsilon}; \quad (2)$$

$$L = BCE + IOU; \quad (3)$$

where N is the total number of pixels in the output, y, is the target binary value of the ith pixel, and $\hat{y}_i$ is the predicted value of the corresponding pixel. The parameter, $\varepsilon$, is a small number (e.g., $\varepsilon=10^{-7}$) that is introduced to calculate IOU over both of the classes (i.e., bolus and background). In order to evaluate the performance of the model, the predicted images can be converted to binary form using various levels of threshold between 0.5 and 1.0, and IOU can be calculated for each of them and averaged.

In one non-limiting example, an example neural network model was trained for 200 epochs with batches of 2 images using Keras (a high level neural networks API) that runs on top of TensorFlow, to train the network. The training in this example was performed using an RMSProp optimization algorithm with a learning rate of 0.001. In one example study, the IOU for the validation set obtained at the end of the training was 0.75, and the segmented output images were converted to binary form using a threshold of 0.5 for the final output. An example of image frames for a sequence of images generated from a fluoroscopy video and the predicted segmentation of those images after thresholding are shown in FIGS. 3A-3J.

The sharp interface between the white and dark regions of the segmented images marks the outline of the bolus. It gives the shape of the inner mucosal wall of the esophagus at the location of the bolus, but no information about the contracted or relaxed locations of the esophagus. The diameter of the catheter (dashed curve in FIGS. 3A-3E) is approximately 4.2 mm. This can be used as a scale for mapping the pixel data to length.

The relaxed diameter of the esophagus can be approximately identified at some locations in the esophagus that are still lined with barium even after the contraction passes through them. Although, in reality, the esophagus may be collapsed at the relaxed locations, it is contemplated that this assumption does not significantly affect the calculation of intra-bolus pressure. FIGS. 3K-3O display the shape of the esophagus inner wall determined from the segmented medical image data.

The semantic segmentation performed on the esophagram images basically assigns each pixel to one of the two classes: bolus (white region) and the rest (dark region). The resulting segmented images, therefore, do not show a smooth boundary for the bolus and are irregular at the scale of the resolution of the original image. Also, because the segmentation is done on each of the images separately, the continuity between the images is broken. Therefore, in some implementations the pixel data both can be spatially and temporally smoothed. Spatial and temporal smoothing can be implemented without the loss of information of the geometry of the bolus. For instance, smoothening can be performed by Gaussian weighted moving average over a window of 10 and 30 points spatially and temporally, respectively.

Referring again to FIG. 1, the segmented medical image data are then input to a reduced-order model in order to generate output as flow analysis data, as indicated at step 106. The flow analysis data can include one or more of flow rate data, pressure field data, wall stiffness data, and/or relaxation data.

As an example, the information of the boundary of the bolus from the segmented medical image data can be used as an input to a reduced-order model that solves one-dimensional continuity and Navier-Stokes equations to obtain fluid flow rate and pressure. Because the medical image data (e.g., fluoroscopy or other medical images) provides information about the shape of the bolus in a single two-dimensional plane, some approximations regarding the shape of the cross-section can be made in order to conserve the volume of fluid swallowed. The reduced-order model can indicate that the lower esophageal sphincter ("LES") behaves very differently from the rest of the esophagus. The LES acts as a restriction to the outflow of fluid from the esophagus by not expanding as easily as the rest of the esophagus walls. Thus, the reduced-order model can roughly quantify the behavior of the LES in terms of the pressure gradient and flow rate.

The flow analysis output from the reduced-order model can then be displayed to a user or stored for later use, as indicated at step 108. Displaying the flow analysis data may include displaying textual or numerical information derived from or otherwise contained within the flow analysis data, such as quantified values of flow rate, pressure, wall stiffness, and/or relaxation. Additionally or alternatively, displaying the flow analysis data may include displaying data plots and/or images derived from or otherwise contained within the flow analysis data, such as flow maps, pressure field data, and so on. One or more reports can also be generated and displayed to a user, including reports that quantify the behavior of the LES in terms of pressure gradient and flow rate, among other such functional reports.

A non-limiting example of a reduced-order model that can be used to model the transport process as a one-dimensional flow through a flexible tube can be based on the following governing equations:

$$\frac{\partial A}{\partial t} + \frac{\partial Q}{\partial x} = 0; \tag{4}$$

$$\frac{\partial Q}{\partial t} + \frac{\partial}{\partial x}\left(\frac{4}{3}\frac{Q^2}{A}\right) + \frac{A}{\rho}\frac{\partial P}{\partial x} + \frac{8\pi\mu Q}{\rho A} = 0. \tag{5}$$

Eqns. (4) and (5) are continuity and momentum equations, respectively. Here, $\rho$ is density of the fluid and $\mu$ is viscosity of the fluid respectively. The cross-section of the esophagus or other tubular organ, $A(x, t)$, can be assumed to be initially circular in shape and can be later scaled to an elliptical shape for enforcing volume conservation. The flow-rate, $Q(x, t)$, can be defined as, $$Q = u_m A \tag{6};$$

where $u_m$ is the mean velocity of the fluid across a cross-section. The factor 4/3 arises in the momentum equation because it is assumed in this example that a there is a parabolic velocity profile perpendicular to the direction of flow. It is also assumed in this example that there is no displacement in the z-direction.

The integral of the first term in the momentum equation over the length, L, of the esophagus or other tubular organ gives a measure of how efficiently the bolus is transported through the esophagus or other tubular organ. In an ideal situation, it can be assumed that the bolus moves at a constant velocity, c, without changing its shape. Using Eqn. (4), an expression for the flow-rate can be derived as, $$Q = -\frac{\partial}{\partial t}\int_0^x A d\xi = -\frac{\partial V_x}{\partial t}; \tag{7}$$

where $V_x$ is the volume up to location, x. Integrating the flow-rate over the length of the esophagus (or other tubular organ) yields, $$\int_0^L Q dx = -\frac{\partial}{\partial t}\int_0^L\int_0^x A d\xi dx \tag{8}$$

Figure 4:
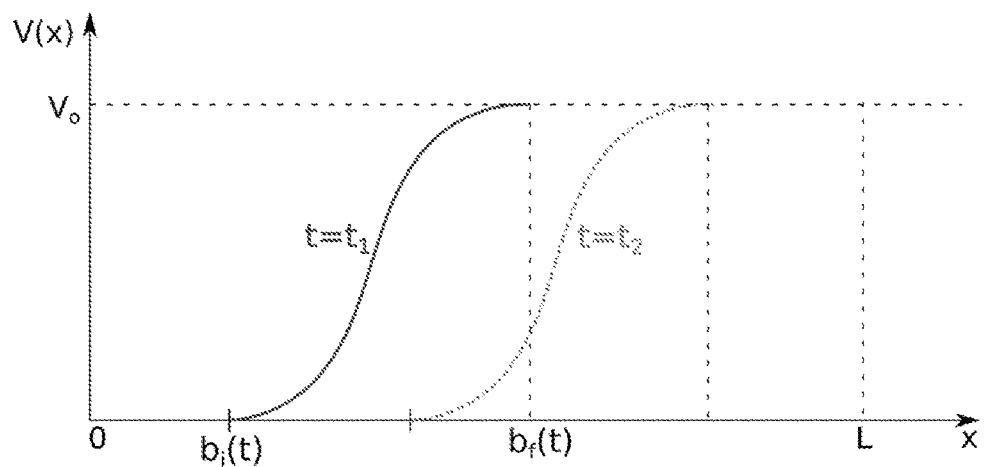
FIG. 4 shows an example plot of volume inside the esophagus up to a position, x.

-continued $$= -\frac{\partial}{\partial t}\int_0^{b_i(t)} V_x dx - \frac{\partial}{\partial t}\int_{b_i(t)}^{b_f(t)} V_x dx - \frac{\partial}{\partial t}\int_{b_f(t)}^L V_x dx$$

where $b_i(t)$ and $b_f(t)$ are the locations of the start and end of the bolus, respectively. The first term in the right hand side of Eqn. (8) is equal to zero because the bolus is not present in that part of the esophagus (or other tubular organ). If the shape of the bolus does not change as it moves along the esophagus (or other tubular organ), such as shown in the example volume plots of FIG. 4, then the second term disappears as well. Therefore, Eqn. (8) can be reduced to the following form:

$$\int_0^L \frac{\partial Q}{\partial t} dx = -\frac{\partial^2}{\partial t^2}(V_o(L - ct)) = 0. \tag{9}$$

Eqns. (4) and (5) can be non-dimensionalized to the following form:

$$\frac{\partial \alpha}{\partial \tau} + \frac{\partial q}{\partial \chi} = 0; \tag{10}$$

$$\frac{\partial q}{\partial \tau} + \frac{\partial}{\partial \chi}\left(\frac{4}{3}\frac{q^2}{\alpha}\right) + \alpha\frac{\partial p}{\partial \chi} + \psi\frac{q}{\alpha} = 0. \tag{11}$$

Here, $\chi = x/L$, $\alpha = A/A_o$, $p = P/(\rho c^r)$, $q = Q/(A_o c)$, and $\tau = ct/L$, where $A_o$ is the relaxed cross-sectional area of the esophagus (or other tubular organ) lumen, and c is the average velocity of the center of the bolus. The center of the bolus, $x_b$, can be located at every time instant using the following relation:

$$x_b = \frac{\int_0^L x(A - A_o) dx}{\int_0^L (A - A_o) dx}. \tag{12}$$

The boundary conditions imposed depend on the functioning of the upper and lower esophageal sphincters at the proximal and distal ends of the esophagus respectively. The upper esophageal sphincter ("UES") is located at the distal end of the pharynx and remains closed in order to prevent the entry of air into the esophagus during breathing and reflux of the bolus from the esophagus into the pharynx. It relaxes for 0.32-0.5 seconds in order to allow the bolus to enter the esophagus.

Figure 5:
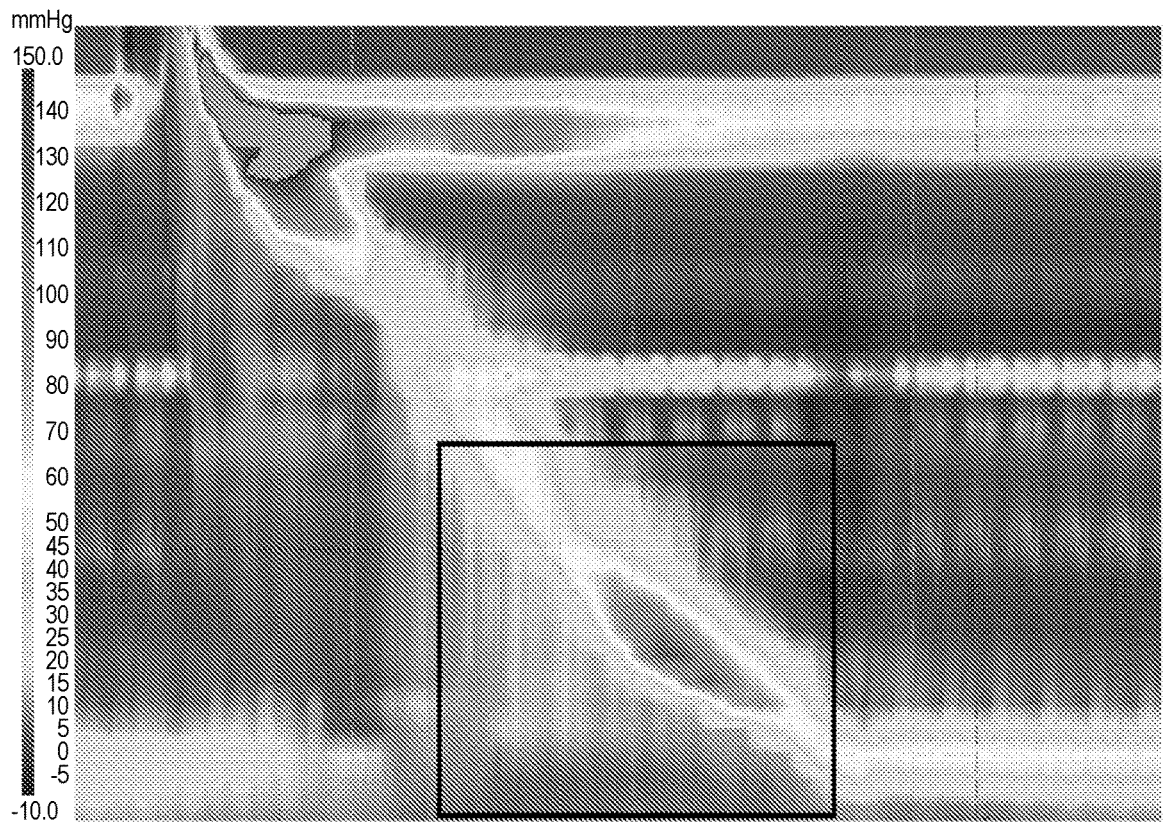
FIG. 5 shows an example of esophageal pressure topography generated from the readings of pressure sensors on a manometry catheter. The horizontal-axis represents time and the vertical axis represents the length along the esophagus. The rectangular box shows the location of the EPT corresponding to the fluoroscopy.

The esophageal pressure topography (obtained through manometry) in FIG. 5 shows this behavior of the UES. The horizontal high pressure zone at the top marks the location of the UES, which remains closed and presses upon the manometry catheter. It opens only to allow the bolus to enter the esophagus, which is visible as the break in the continuous high pressure zone due to relaxation. The oblique high pressure zone represents the peristaltic contraction which pushes the bolus along the esophagus. Hence, the location of the upstream end of the bolus can be roughly identified to be just underneath the contraction. The lower esophageal sphincter ("LES") is marked by the lower horizontal high pressure zone. There is a break in of high pressure in this location as the bolus reaches the LES. This represents the relaxation of the LES in order to allow the bolus to empty into the stomach.

In analyses where the bolus is already inside the esophagus, the UES is closed. Hence, in these instances there is no flow at the entry; that is, $q(\chi=0, \tau)=0$. It can also be assumed that there is no initial flow inside the esophagus; that is, $q(\chi, \tau=0)=0$. As another example boundary condition, the pressure at the entry can also be specified to be zero.

Figure 6:
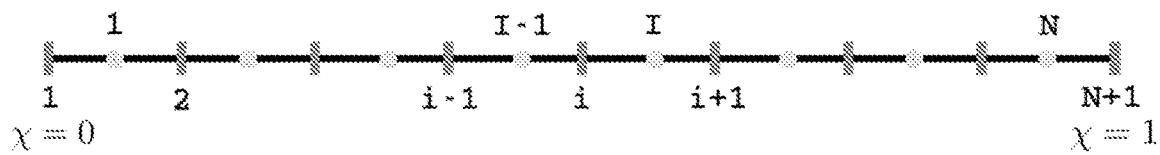
FIG. 6 shows an example of a staggered meshing of a domain. The cell boundaries and centers are shown in red and green, respectively.

Using the diameter data from the segmented image sequences after post-processing, the cross-section areas, a, can be calculated throughout the length of the esophagus, or other tubular organ. A finite volume method can be used to solve for q and p in Eqns. (10) and (11). The flow-rate, q, can be calculated by solving Eqn. (10). A staggered grid can be used to discretize the domain, as shown in FIG. 6. The flow rate, q, is specified at the cell boundaries and pressure, p, is specified at the cell centers. The cross-section area, $\alpha$, is known for both the cell boundaries and centers. The quantities specified at the cell centers have subscripts in capital letters, and those at the cell boundaries in small letters. The superscript "o" represents the value of a quantity in the previous time instant. As an example, Eqn. (10) can be solved using a fully-implicit method with the following discretized form:

$$q_i = q_{i-1} + \frac{\Delta \chi}{\Delta \tau}(\alpha_{I-1} - \alpha_{I-1}^o) \text{ for } i, I = 2, 3, \ldots, (N+1) \quad (13)$$

where, N is the total number of cells. Using the calculated values of q and the known values of $\alpha$, the values of p at the cell centers can be calculated using the following discretized form:

$$P_I = P_{I-1} - \left(\frac{\Delta \chi}{\alpha_i}\right)\frac{q_i - q_i^o}{\Delta \tau} - \psi \frac{q_i \Delta \chi}{\alpha_i^2} - \frac{1}{3\alpha_i}\left(\frac{(q_{i+1}+q_i)^2}{\alpha_I} - \frac{(q_i+q_{i-1})^2}{\alpha_{I-1}}\right). \quad (14)$$

Figure 7A:
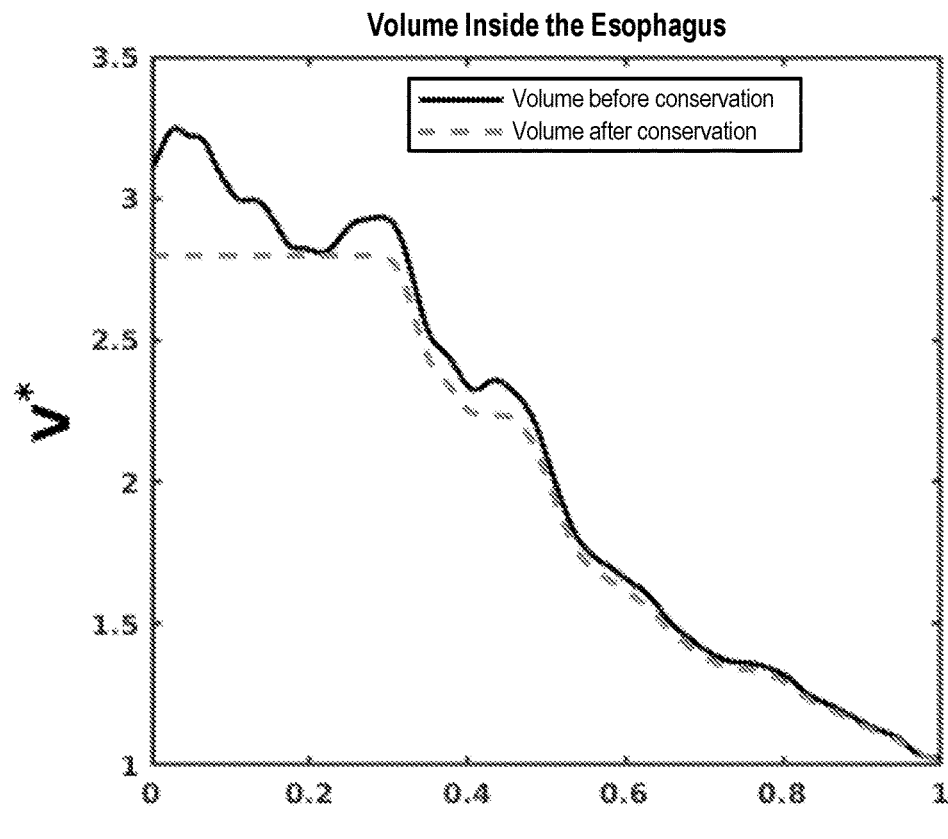
FIGS. 7A-7C illustrate an enforcement of volume conservation.

Fluoroscopy and other two-dimensional medical images show only a two-dimensional section of the esophagus (or other tubular organ). Assuming a circular cross-section, the total volume of fluid inside the tubular organ can be calculated, as shown in FIG. 7A. The volume, V, can be non-dimensionalized using the product of the non-distended cross-sectional area and the length of the esophagus, $$V^* = \frac{V}{A_o L}.$$

In terms of the volume of fluid inside the esophagus, the bolus transport can be categorized into two parts: pure transport (no flow at $\chi=1$) and emptying. In FIG. 7A, transport without emptying occurs until $\tau=0.3$, and then the volume inside the esophagus decreases continuously. Because there is no flow boundary condition at the proximal end, the volume inside the esophagus can never exceed the total volume at $\tau=0$. But, during pure transport at $\tau<0.3$, there are some fluctuations in the volume inside the esophagus. This can be attributed to the calculation of volume assuming the esophagus is perfectly circular in cross-section at all times. Without information about the actual shape of the cross-section at $\tau=0$, neither the calculated volume at $\tau=0$, nor the maximum calculated volume during the whole transport can be reliably used in order to enforce volume conservation.

Figure 7B:
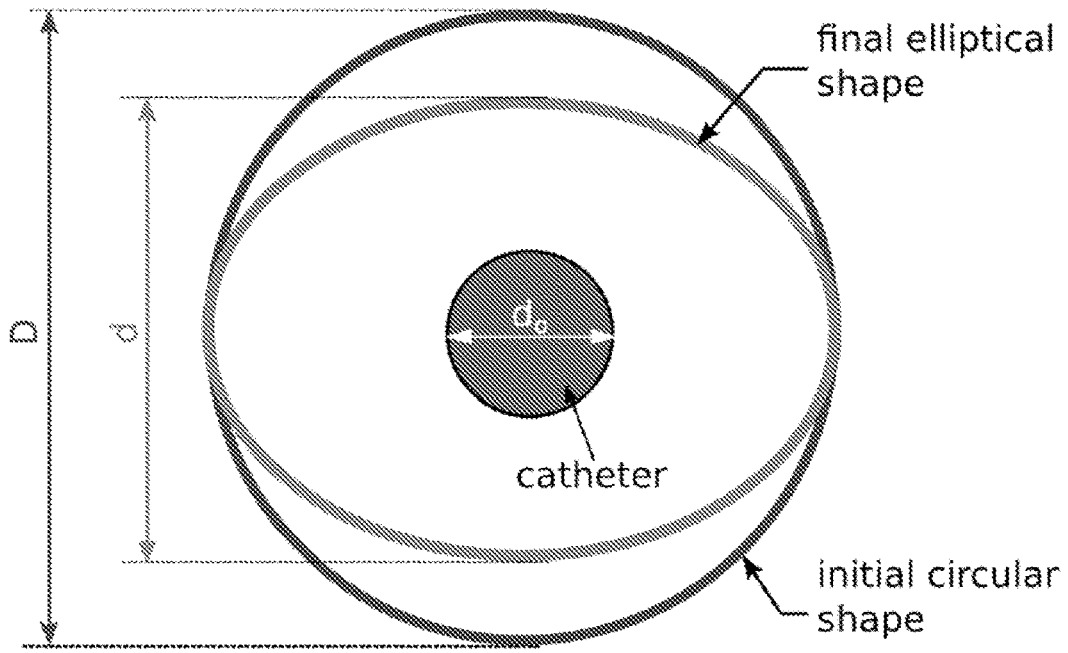

In reality, the shape of the esophagus cross-section is elliptical, with the major axis being observed in the barium swallow images. The volume of fluid swallowed for each test, $V_o$, can be used to scale the circular cross-sectional area to an elliptical shape (see FIG. 7B) so that the total volume inside the bolus is equal to that value. The scaling can be performed in the following manner:

$$A^* = A_O + \beta(A - A_o); \quad (15)$$

$$\beta = \frac{V_o}{\int_0^L (A - A_o) dx};$$

where $A_o$ is the cross-section area of the esophagus at relaxed state, A* is the scaled cross-section area to conserve volume, $\beta$ is the scaling factor, and L is the length of esophagus visible in the esophagram. This method scales only the cross-section of the esophagus at the bolus location, and does not change the relaxed sections.

In some implementations, a constant volume can be enforced during pure transport (as shown by the red dashed line in FIG. 7A) until $\tau=0.3$. However, during emptying ($\tau>0.3$), the volume inside the esophagus begins to decrease, and so, the volume cannot be scaled using a reference value. Therefore, the volume is scaled using $\beta$ calculated at the start of the emptying process, at $\tau=0.3$. In general, the shape of the esophageal cross-section varies along the length, and the shape it takes when distended depends upon the material properties of the wall. The $\beta$ value calculated at every time step during pure transport gives a measure of the shape of the cross-section.

As the bolus is transported along the length of esophagus, the $\beta$ parameter takes on different values, thus estimating the shape in finite segments along the length. At the beginning of emptying, the distal end of the bolus has already reached the end of the esophagus. After this, the length of the bolus keeps on decreasing without moving any forward. Therefore, the $\beta$ calculated at $\tau=0.3$ is a reasonable scaling for the emptying process.

Figure 7C:
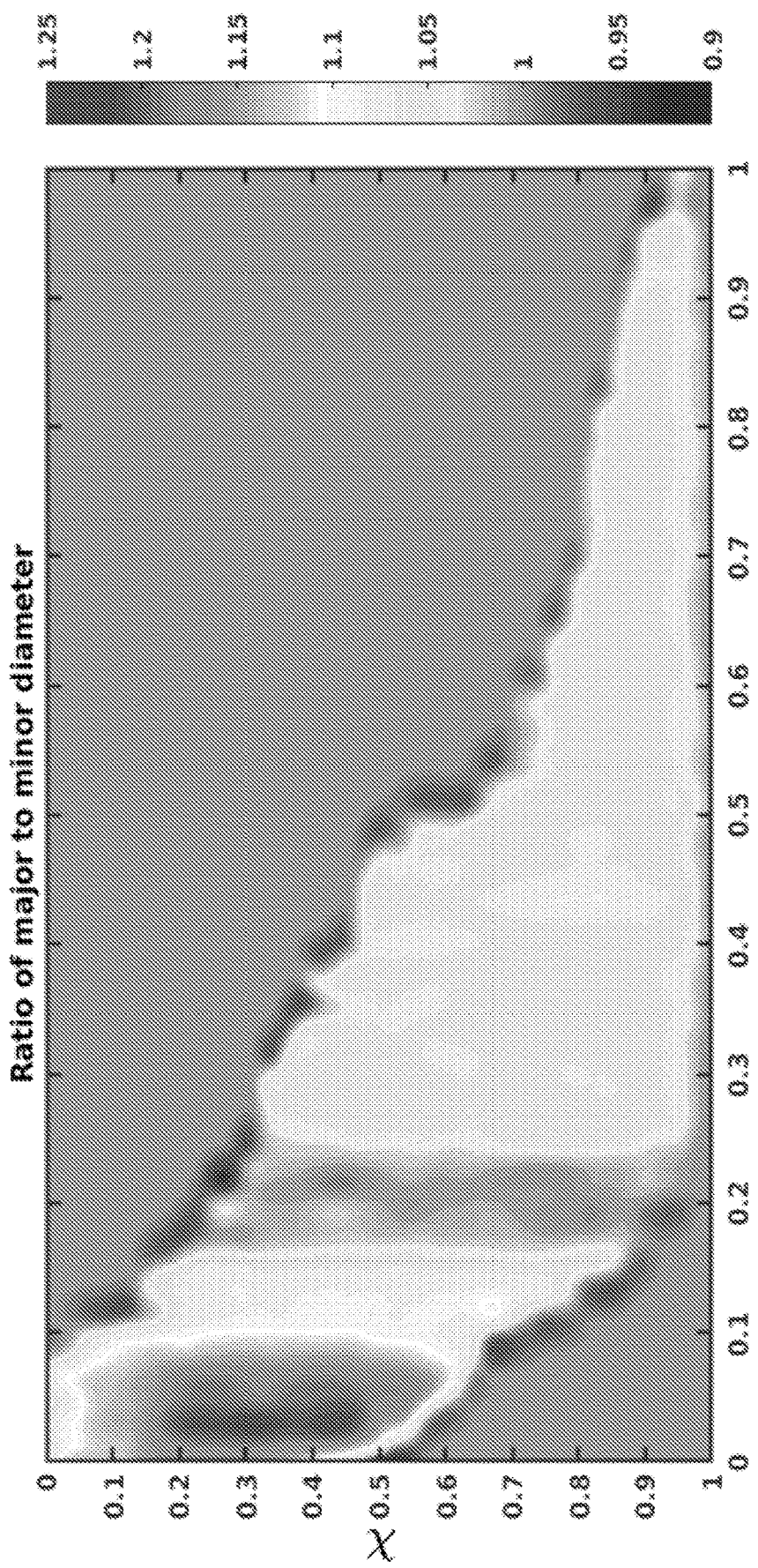

During emptying, the volume inside the esophagus will consistently decrease. Therefore, if at any instant, the volume inside the bolus is more than it was in the previous time instant, the volume at the current instant can be enforced to be equal to the previous instant. The effect of the volume correction on the diameter of the esophagus is shown in FIG. 7A. The ratio of the major and minor diameter of the scaled elliptical shape of the cross-section is shown in FIG. 7C. The diameters are non-dimensionalized using the relaxed diameter of the esophagus, $d_o$, which in this example was 6.4 mm. It can be seen that the change in diameter occurs only at the location of the bolus because the ratio of major to minor diameter remains equal to 1 for the rest of the esophagus. Comparing FIGS. 7A and 7C, it can be seen that the maximum changes in diameter occur before $\tau=0.3$ where the difference between the reference volume and the calculated volume is maximum, thus scaling the cross-section into a flatter ellipse. Also, the ratio of the major to minor diameter remains approximately constant during the emptying process. This is because a constant $\beta$ was assumed during emptying, and hence the shape of the cross-section does not change significantly.

Figure 8:
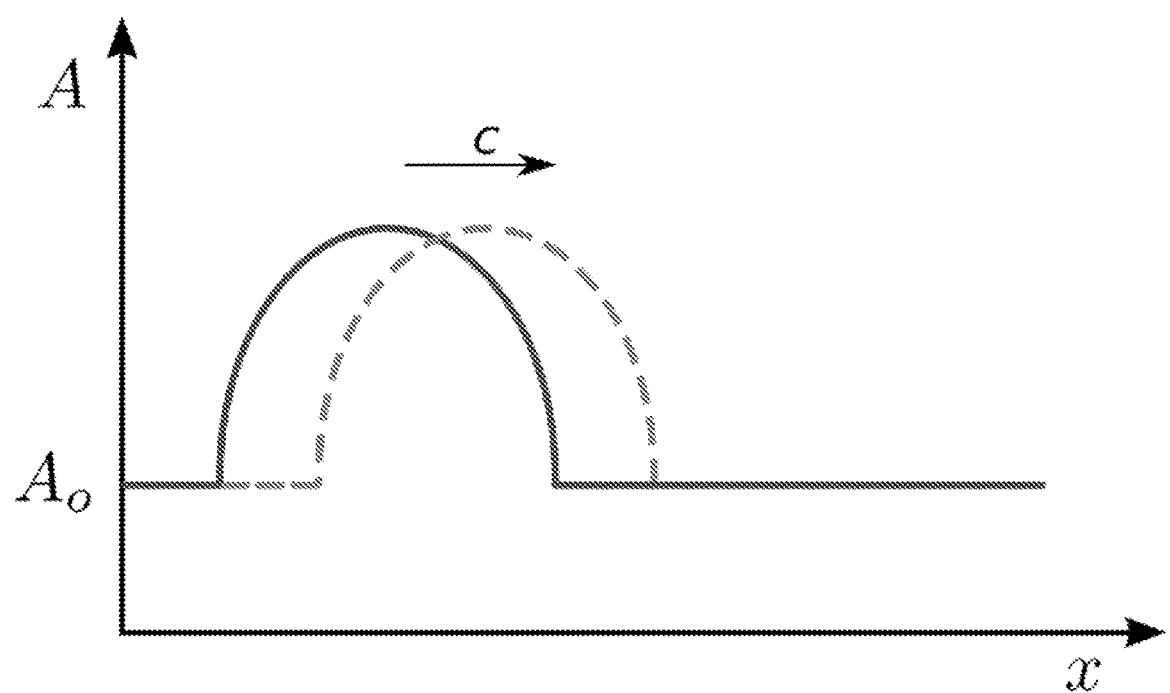
FIG. 8 shows an example of bolus transport in a reference model.

A reference model that captures an ideal bolus transport can be constructed and implemented to understand how the stiffness and relaxation of the esophageal wall is related to the pressure developed during the transport. An ideal bolus transport can be defined if the bolus moves at a constant velocity without any change in its shape and size. FIG. 8 shows the variation of area with respect to x for an example reference model. The bolus moves at a constant velocity, c, in the positive x-direction. This form of area variation can be represented as, $$A = g(x - ct) \quad (16);$$

where g is some function of x and t. The non-dimensional form of Eqn. (16) using $\chi = x/L$ and $\tau = ct/L$, can be written as, $$\alpha = f(\chi - \tau) = f(z) \quad (17);$$

where $f(\chi, \tau)$ is the transformation from $g(x, t)$ when the variables are non-dimensionalized. The parameters $\chi$ and $\tau$ can be combined to form a new transformed coordinate, $z = \chi - \tau$. Using Eqns. (10) and (17), and converting the spatial and temporal derivatives in terms of derivatives with respect to z as $\partial/\partial\chi = \partial/\partial z$, $\partial/\partial\tau = -\partial/\partial z$, the flow-rate, $q_r$, can be obtained as follows:

$$q_r = \int_0^z \frac{\partial \alpha}{\partial z} = f(z) + q_{ro}; \quad (18)$$

where $q_{ro} = -\alpha_0$ and $\alpha_o = \alpha(z=0) = 1$. The subscript "r" is used to represent quantities in the reference model. It should be noted that the flow-rate $q_r$ is calculated between the start of the bolus to the end of the esophagus. But, the flow-rate on the proximal side of the contraction can be estimated using Eqn. (18) for negative values of z. If the viscous term is negligible compared to the inertia terms of Eqn. (11), and the velocity profile is assumed to be flat, the following form of the momentum equation can be achieved:

$$\frac{\partial q_r}{\partial \tau} + \frac{\partial}{\partial \chi}\left(\frac{q_r^2}{\alpha}\right) + \alpha \frac{\partial p_r}{\partial \chi} = 0. \quad (19)$$

On substituting Eqns. (17) and (18) into Eqn. (19), and converting the temporal and spatial derivatives to derivatives in terms of z, the following simplified form is yielded:

$$\frac{\partial p_r}{\partial z} = \frac{q_{ro}^2}{f^3} \frac{\partial f}{\partial z}. \quad (20)$$

The solution of Eqn. (20) gives the following form of pressure:

$$p_r = \frac{1}{2\alpha^2}(\alpha^2 - 1). \quad (21)$$

The fluid pressure developed inside the esophagus can be directly proportional to the cross-sectional area of the esophagus lumen. Hence, the pressure can estimated using the following tube-law:

$$p_r = k(\alpha - 1) \quad (22);$$

where k is the non-dimensional stiffness of the esophagus wall. The dimensional form of the stiffness can be obtained by multiplying with $\rho c^2$. From Eqns. (21) and (22), the following expression for k can be obtained:

$$k = \frac{1}{2\alpha^2}(\alpha + 1). \quad (23)$$

Figure 9A:
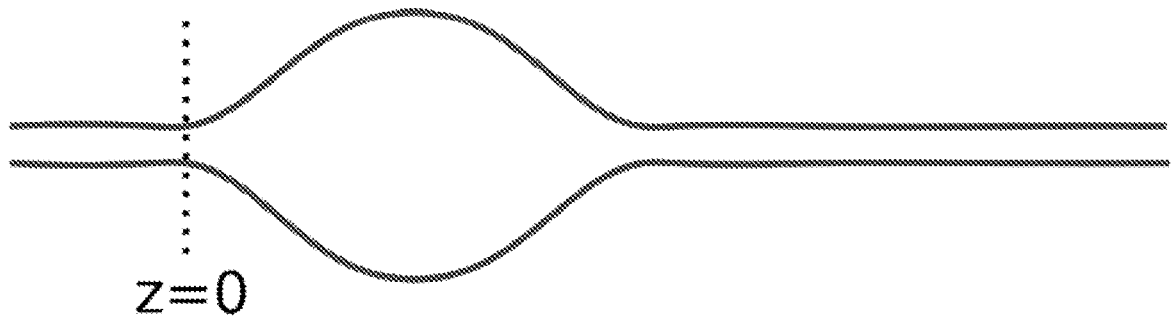
FIGS. 9A and 9B show effects of esophageal relaxation in a reference model.
Figure 9B:
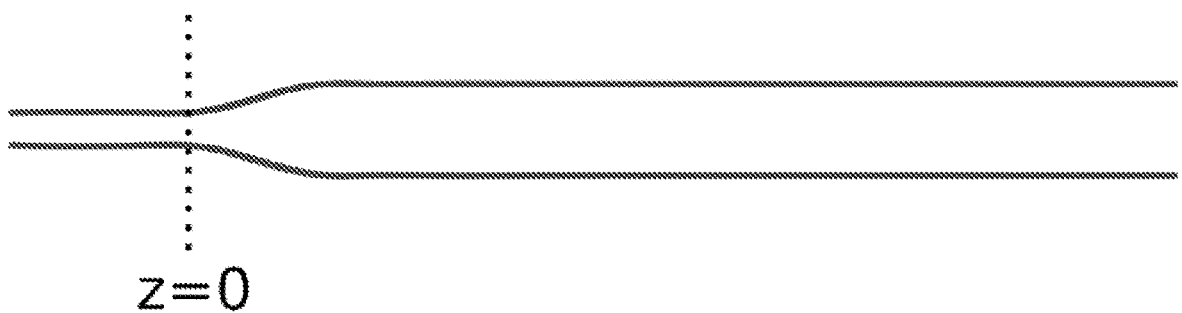

Because $\alpha \geq 1$, from Eqn. (23) it can be seen that the magnitude of k decreases with an increase in $\alpha$. Hence, the minimum stiffness corresponds to the maximum cross-sectional area. This captures the effect of active relaxation of the esophageal walls to incorporate the bolus. Without active relaxation, it would be expected for k to be independent of $\alpha$. Note that to obtain the expressions for $q_r$, $p_r$, and k, integration from $z=0$ to any point where $z>0$ has been performed. The point $z=0$ corresponds to the proximal end of the bolus assuming that this point was at $x=0$ at $\tau=0$. Therefore, for k to be constant, a should be constant from $z=0$ to the end of the esophagus. So, without relaxation, the bolus would not have such a bulb shape as seen in the reference model in FIG. 9A, and instead would have cylindrical shape of constant diameter that extends from the contraction (at $z=0$) to the end of the esophagus as shown in FIG. 9B.

Thus, as noted, stiffness of the esophageal walls and the wall relaxation that occurs in front of the peristaltic contraction wave in order to allow space for the incoming bolus can be estimated by utilizing a reference model. In general, the reference model is constructed on the basis that the bolus moves at a constant velocity, that the bolus shape does not change, and that viscous effects are negligible.

Figure 10A:
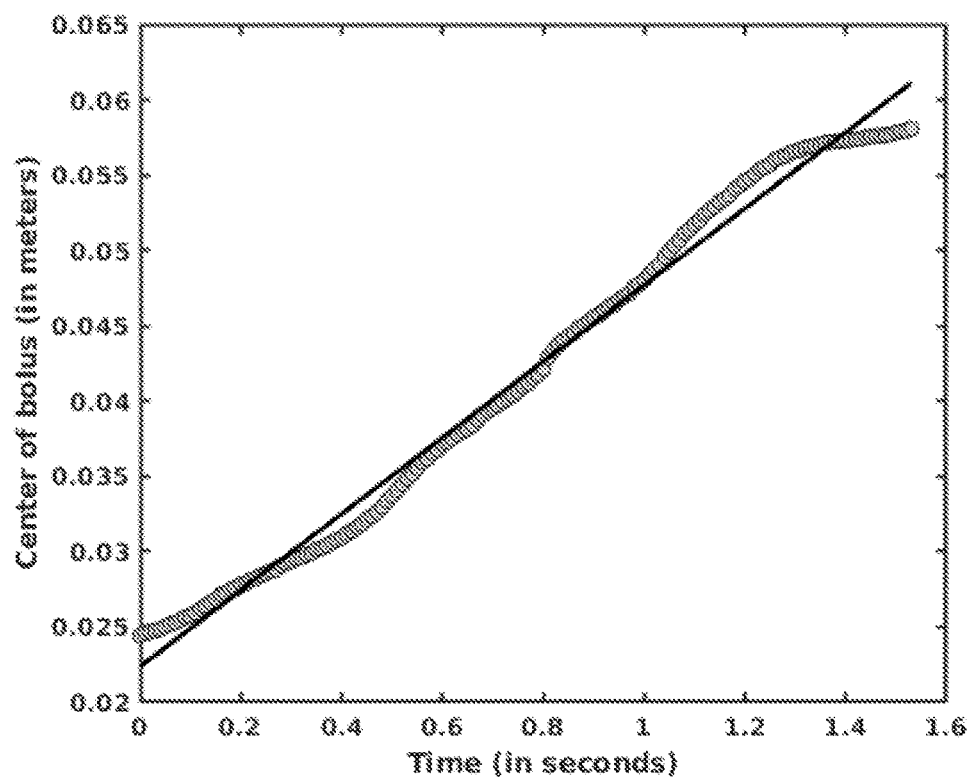
FIGS. 10A-10D show an example of estimating esophageal stiffness.

In order to get an estimate of the average velocity of the bolus, c, the variation of the center of the bolus, $x_b$, can be plotted using Eqn. (12) with respect to time. In FIG. 10A, the variation of the bolus center can be seen as lying along an approximately straight line with small variations, and can be appropriately fitted with a linear curve, the slope of which gives the average speed of the bolus. This satisfies the first assumption for the reference model.

Figure 10B:
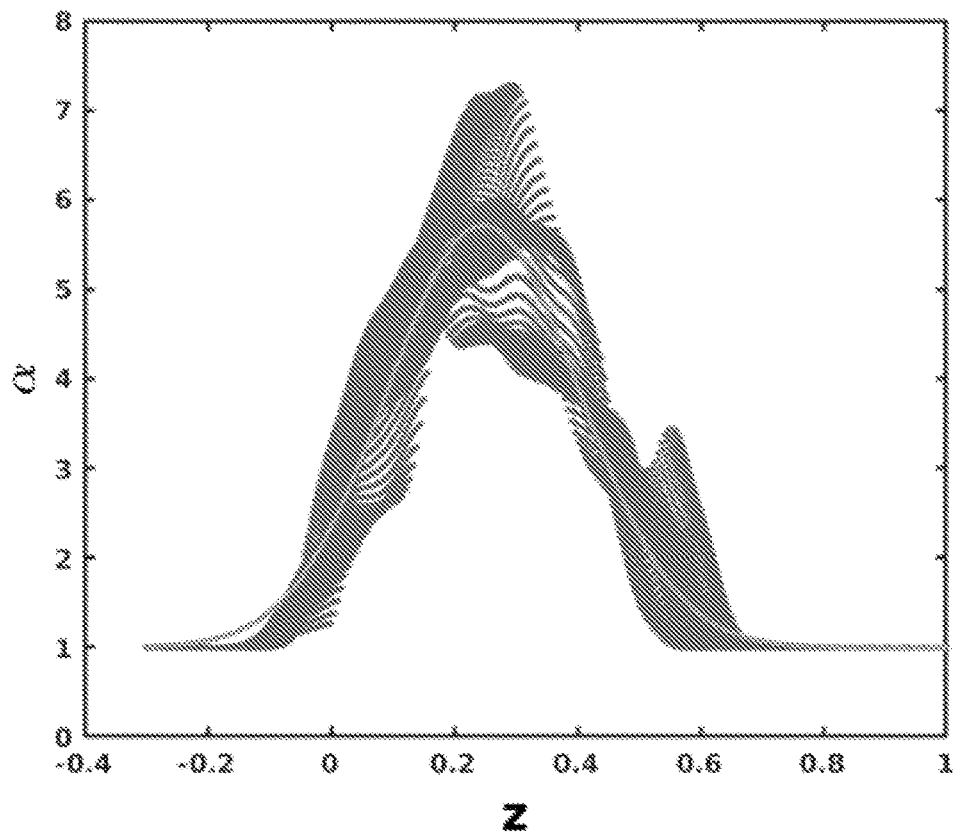

In order to satisfy the second assumption, a constant shape of the bolus is needed. In general, the shape of the bolus will change as it is transported through the esophagus (or other tubular organ). FIG. 10B shows an example scatter plot of non-dimensional cross-sectional area of a bolus with respect to the transformed coordinate z, which is fitted with a Gaussian curve of the form, $$\alpha = ae^{-\left(\frac{z-b}{d}\right)^2} + \alpha_o.$$

This fitted curve can be used as the constant shape of the bolus to estimate the pressure and average stiffness of the esophagus wall.

Using the properties of water for the swallowed fluid, the viscous term of Eqn. (5) is significantly small compared to each of the inertia terms, as well as the sum of the inertia terms. Therefore, the viscous term can be safely neglected to calculate pressure without a significant change in its magnitude, thereby satisfying the third assumption of the reference model.

Figure 10C:
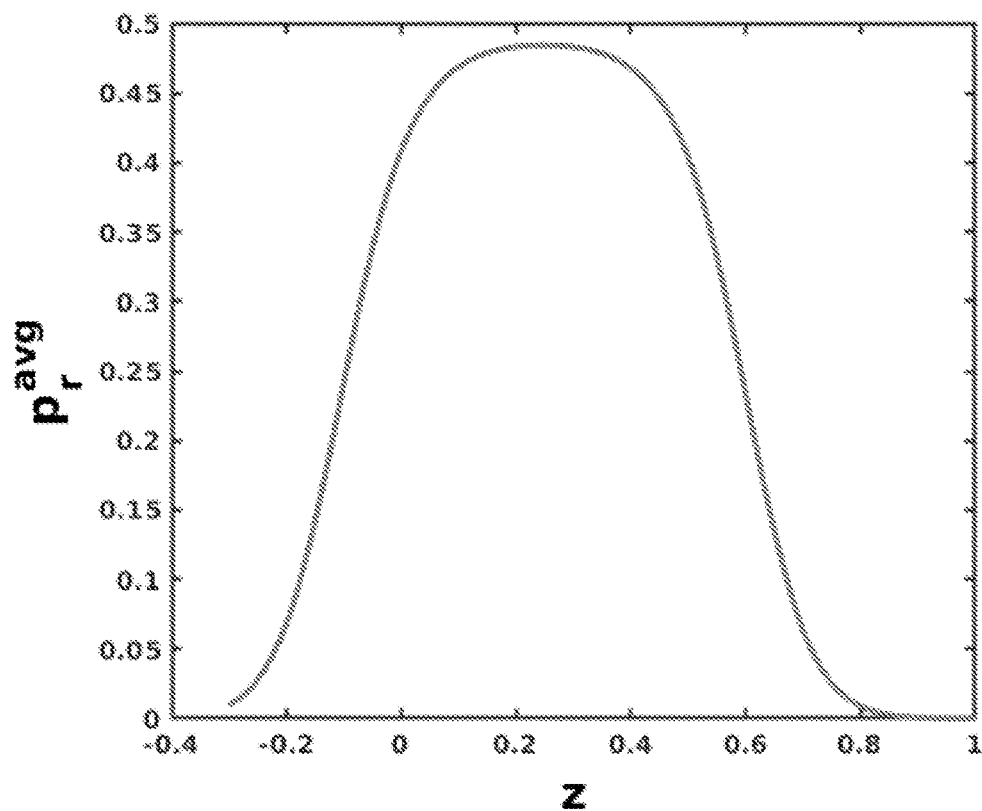
Figure 10D:
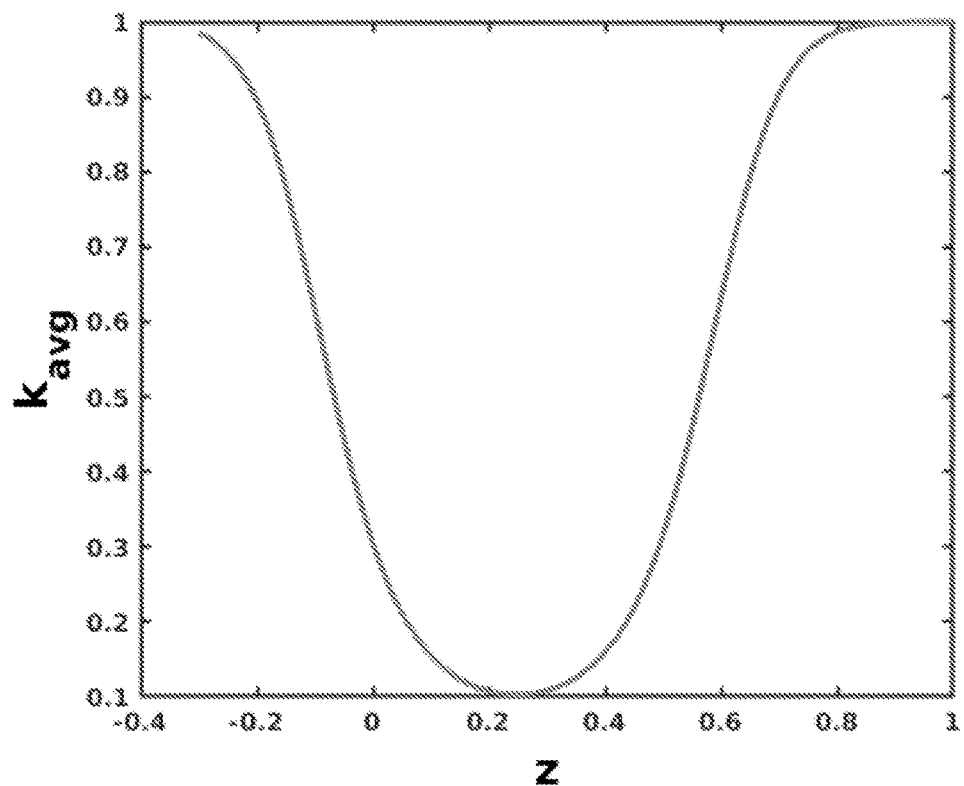

Using the constant speed, c, and the constant shape of the bolus, an average pressure and average stiffness can be calculated according to Eqns. (21) and (23), respectively. FIGS. 10C and 10D show examples of an average pressure and average stiffness calculated using the reference model formulation. Therefore, the fluctuations of pressure that do not match the tube-law pressure form according to Eqn. (22) are eliminated. These fluctuations may be due to the esophagus not being completely horizontal even when the subject is in supine position, and the gravity effects cause the bolus to accelerate or decelerate depending on the orientation of the esophagus as a whole as well as the irregularities in the inner mucosal surface of the lumen. Additionally, the esophagus might deform due to contact with surrounding organs, which in turn vary with time due to pumping of the heart, respiration, or overall movement of the body, thus leading further variations in pressure through variations in the area and consequently the flow rate. The assumption of a circular cross-section, and the scaling to elliptical cross-section for volume conservation might also introduce fluctuations in the model variables. The reference model, thus, eliminates these high fluctuations and captures the essence of the bolus transport by giving a measure of pressure and stiffness that is consistent with the tube law. From FIG. 10D, it can be seen that the average stiffness, $k_{avg}$, is minimum for the corresponding maximum cross-sectional area, thus capturing the effect of active relaxation of the esophagus wall to incorporate the bolus.

Figure 11A:
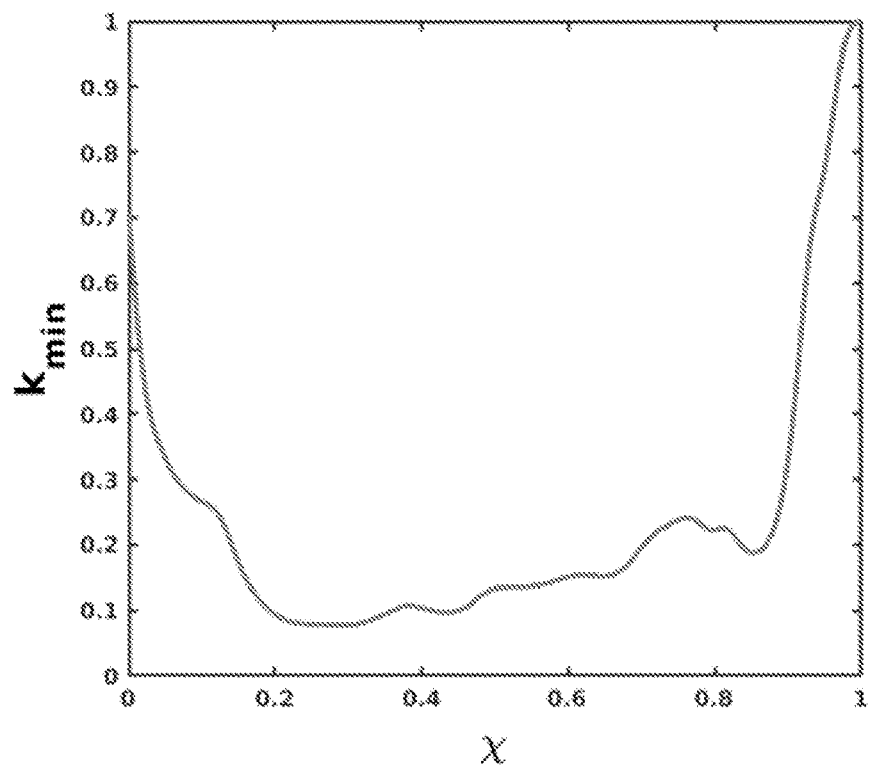
FIGS. 11A and 11B show an example of estimating esophageal relaxation.
Figure 11B:
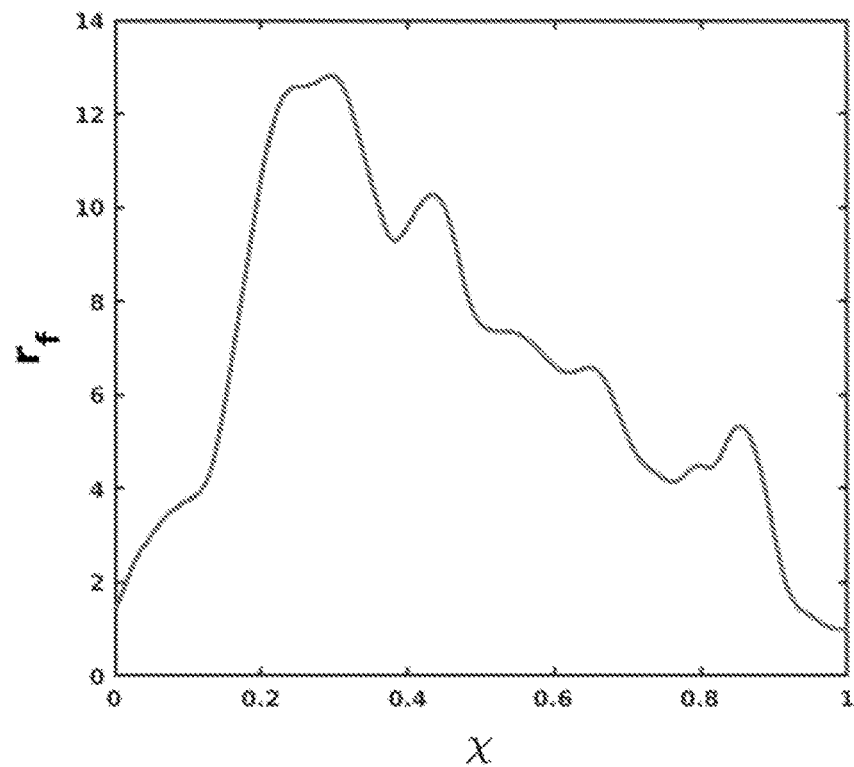

The spatial variations of pressure and stiffness can be calculated using the actual area instead of the approximate area of the bolus (that stays constant during the transport). For instance, the actual area can be used to calculate pressure and stiffness using Eqns. (21) and (23), respectively. In order to estimate the relaxation of the esophagus wall, which is maximum for the minimum value of the stiffness, the minimum stiffness, $k_{min}$, at every location along the length of the esophagus can be plotted, as shown in FIG. 11A. At this stage, the relaxation factor can be defined as, $$r_f = \frac{1}{k_{min}}; \quad (24)$$

where $r_f$ gives a measure of the relaxation of the esophagus wall and is shown in FIG. 11B. It can be seen that the esophagus relaxes approximately 12 times to incorporate the bolus. It should be noted that this estimate of the relaxation is very sensitive to the relaxed cross-sectional area, $A_o$, of the esophagus lumen. For example, a relaxed diameter ($d_o$=7 mm) gives a maximum $r_f$=10.84, whereas for $d_o$=4 2 mm (which corresponds to the diameter of the catheter), the maximum $r_f$ has a value of $r_f$=28.03. In some instances, it may be difficult to identify the lumen in fluoroscopy images, and in these instances further information on $A_o$ and/or $d_o$ can be obtained through CT scans, MRI scans, or higher quality fluoroscopy images, which can therefore be advantageous for estimating $r_f$ to a greater accuracy.

Thus, systems and methods for analyzing a barium swallow fluoroscopy or other flow related medical image data using deep learning and computational fluid dynamics have been described. For instance, the sequence of images from a fluoroscopy or other flow-related medical imaging study can be segmented using a convolutional neural network in order to generate the outline of the bolus transported through the esophagus. This information of the boundary of the bolus can then be used as an input to a reduced-order model that solves the one-dimensional continuity and Navier-Stokes equations to obtain the fluid flow rate and pressure. Because the fluoroscopy gives only information about the shape of the bolus in a single two-dimensional plane, some approximations regarding the shape of the cross-section can be made in order to conserve the volume of the fluid swallowed.

The reduced-order model indicates the LES behaves very differently from the rest of the esophagus. The LES acts as a restriction to the outflow of fluid from the esophagus by not expanding as easily as the rest of the esophagus walls. Thus, the reduced-order model can roughly quantify the behavior of the LES in terms of the pressure gradient and flow rate.

A reference model has also been described, which can be used to estimate the esophageal wall stiffness and relaxation. Based on a mechanistic study, the esophageal transport can be categorized into three zones: a contraction zone behind the bolus, a relaxation zone at the bolus, and a baseline zone for the rest of the esophagus. Although the systems and methods were described with respect to the application of the reduced-order and reference models to barium swallow fluoroscopy, as noted above they can be applied to other methods of medical imaging including CT and MRI in order to predict flow rate, pressure, wall stiffness, and relaxation.

Figure 12:
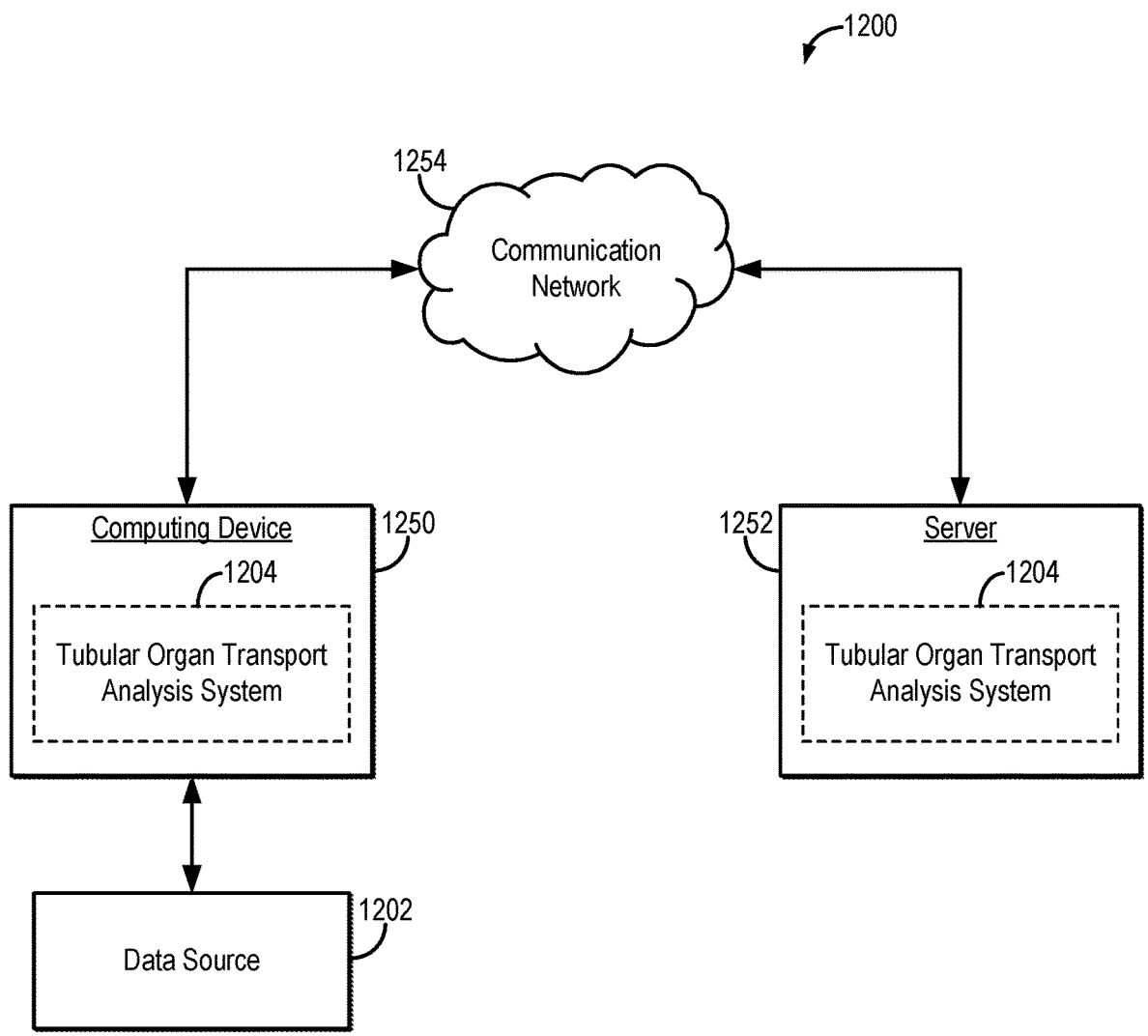
FIG. 12 is a block diagram of an example medical image-based tubular organ transport analysis system.

Referring now to FIG. 12, an example of a system 1200 for generating flow, pressure, wall stiffness, and relaxation data from medical image data of a tubular organ in accordance with some embodiments of the systems and methods described in the present disclosure is shown. As shown in FIG. 12, a computing device 1250 can receive one or more types of data (e.g., medical image data, manometry data) from data source 1202, which may be a medical image data source and/or a manometry data source. In some embodiments, computing device 1250 can execute at least a portion of a tubular organ transport analysis system 1204 to generate flow, pressure, wall stiffness, and relaxation data from medical image data received from the data source 1202.

Additionally or alternatively, in some embodiments, the computing device 1250 can communicate information about data received from the data source 1202 to a server 1252 over a communication network 1254, which can execute at least a portion of the tubular organ transport analysis system 1204. In such embodiments, the server 1252 can return information to the computing device 1250 (and/or any other suitable computing device) indicative of an output of the tubular organ transport analysis system 1204.

In some embodiments, computing device 1250 and/or server 1252 can be any suitable computing device or combination of devices, such as a desktop computer, a laptop computer, a smartphone, a tablet computer, a wearable computer, a server computer, a virtual machine being executed by a physical computing device, and so on. The computing device 1250 and/or server 1252 can also reconstruct images from the data.

In some embodiments, data source 1202 can be any suitable source of image data (e.g., measurement data, images reconstructed from measurement data), such as an x-ray fluoroscopy system, a CT system, an MRI system, another computing device (e.g., a server storing image data), and so on. In some embodiments, data source 1202 can be local to computing device 1250. For example, data source 1202 can be incorporated with computing device 1250 (e.g., computing device 1250 can be configured as part of a device for capturing, scanning, and/or storing images). As another example, data source 1202 can be connected to computing device 1250 by a cable, a direct wireless link, and so on. Additionally or alternatively, in some embodiments, data source 1202 can be located locally and/or remotely from computing device 1250, and can communicate data to computing device 1250 (and/or server 1252) via a communication network (e.g., communication network 1254).

In some embodiments, communication network 1254 can be any suitable communication network or combination of communication networks. For example, communication network 1254 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 1254 can be a local area network, a wide area network, a public network (e.g., the Internet), a private or semi-private network (e.g., a corporate or university intranet), any other suitable type of network, or any suitable combination of networks. Communications links shown in FIG. 12 can each be any suitable communications link or combination of communications links, such as wired links, fiber optic links, Wi-Fi links, Bluetooth links, cellular links, and so on.

Figure 13:
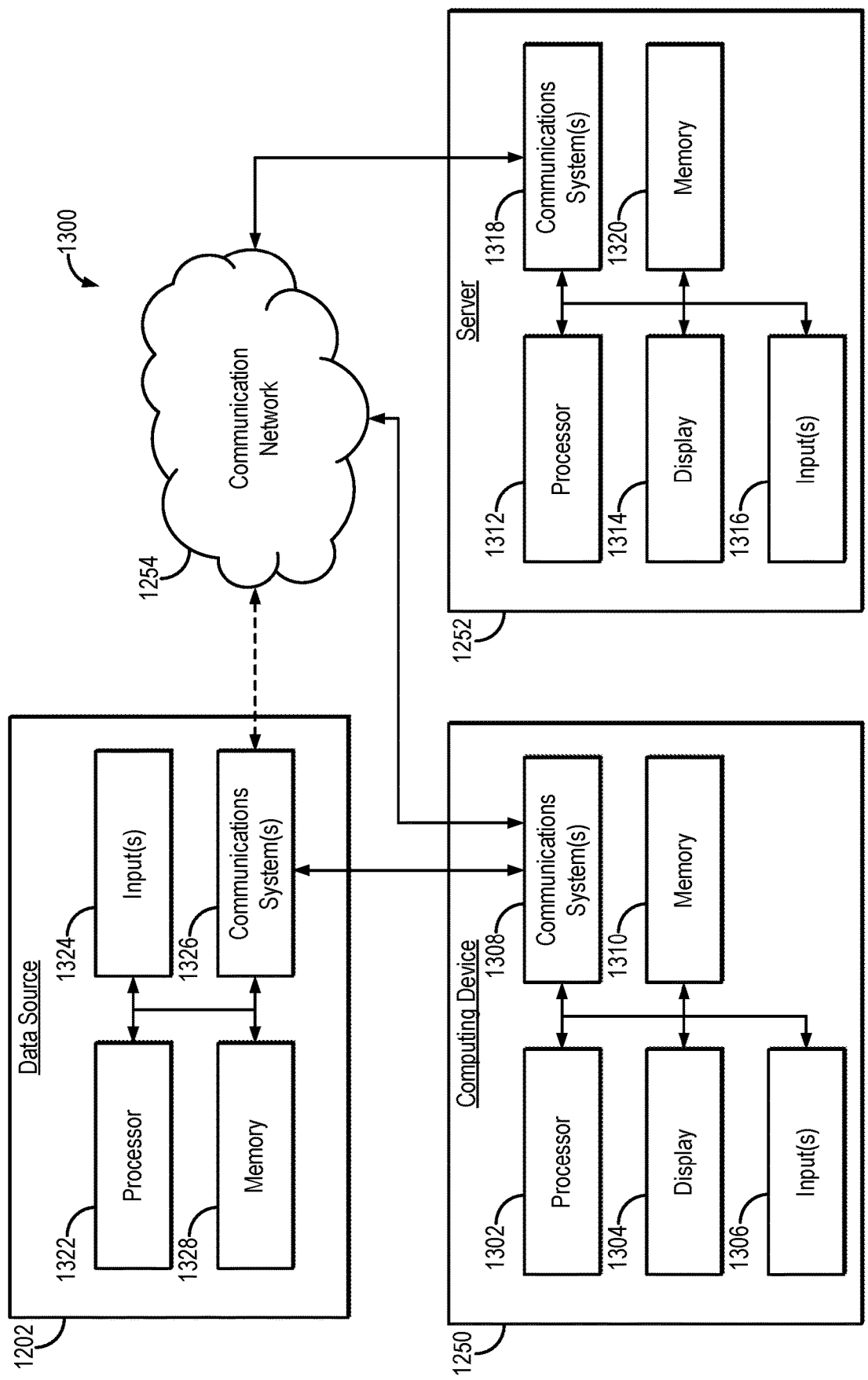
FIG. 13 is a block diagram of example components that can implement the medical image-based tubular organ transport analysis system of FIG. 12.

Referring now to FIG. 13, an example of hardware 1300 that can be used to implement data source 1202, computing device 1250, and server 1252 in accordance with some embodiments of the systems and methods described in the present disclosure is shown. As shown in FIG. 13, in some embodiments, computing device 1250 can include a processor 1302, a display 1304, one or more inputs 1306, one or more communication systems 1308, and/or memory 1310. In some embodiments, processor 1302 can be any suitable hardware processor or combination of processors, such as a central processing unit ("CPU"), a graphics processing unit ("GPU"), and so on. In some embodiments, display 1304 can include any suitable display devices, such as a computer monitor, a touchscreen, a television, and so on. In some embodiments, inputs 1306 can include any suitable input devices and/or sensors that can be used to receive user input, such as a keyboard, a mouse, a touchscreen, a microphone, and so on.

In some embodiments, communications systems 1308 can include any suitable hardware, firmware, and/or software for communicating information over communication network 1254 and/or any other suitable communication networks. For example, communications systems 1308 can include one or more transceivers, one or more communication chips and/or chip sets, and so on. In a more particular example, communications systems 1308 can include hardware, firmware and/or software that can be used to establish a Wi-Fi connection, a Bluetooth connection, a cellular connection, an Ethernet connection, and so on.

In some embodiments, memory 1310 can include any suitable storage device or devices that can be used to store instructions, values, data, or the like, that can be used, for example, by processor 1302 to present content using display 1304, to communicate with server 1252 via communications system(s) 1308, and so on. Memory 1310 can include any suitable volatile memory, non-volatile memory, storage, or any suitable combination thereof. For example, memory 1310 can include RAM, ROM, EEPROM, one or more flash drives, one or more hard disks, one or more solid state drives, one or more optical drives, and so on. In some embodiments, memory 1310 can have encoded thereon, or otherwise stored therein, a computer program for controlling operation of computing device 1250. In such embodiments, processor 1302 can execute at least a portion of the computer program to present content (e.g., images, user interfaces, graphics, tables), receive content from server 1252, transmit information to server 1252, and so on.

In some embodiments, server 1252 can include a processor 1312, a display 1314, one or more inputs 1316, one or more communications systems 1318, and/or memory 1320. In some embodiments, processor 1312 can be any suitable hardware processor or combination of processors, such as a CPU, a GPU, and so on. In some embodiments, display 1314 can include any suitable display devices, such as a computer monitor, a touchscreen, a television, and so on. In some embodiments, inputs 1316 can include any suitable input devices and/or sensors that can be used to receive user input, such as a keyboard, a mouse, a touchscreen, a microphone, and so on.

In some embodiments, communications systems 1318 can include any suitable hardware, firmware, and/or software for communicating information over communication network 1254 and/or any other suitable communication networks. For example, communications systems 1318 can include one or more transceivers, one or more communication chips and/or chip sets, and so on. In a more particular example, communications systems 1318 can include hardware, firmware and/or software that can be used to establish a Wi-Fi connection, a Bluetooth connection, a cellular connection, an Ethernet connection, and so on.

In some embodiments, memory 1320 can include any suitable storage device or devices that can be used to store instructions, values, data, or the like, that can be used, for example, by processor 1312 to present content using display 1314, to communicate with one or more computing devices 1250, and so on. Memory 1320 can include any suitable volatile memory, non-volatile memory, storage, or any suitable combination thereof. For example, memory 1320 can include RAM, ROM, EEPROM, one or more flash drives, one or more hard disks, one or more solid state drives, one or more optical drives, and so on. In some embodiments, memory 1320 can have encoded thereon a server program for controlling operation of server 1252. In such embodiments, processor 1312 can execute at least a portion of the server program to transmit information and/or content (e.g., data, images, a user interface) to one or more computing devices 1250, receive information and/or content from one or more computing devices 1250, receive instructions from one or more devices (e.g., a personal computer, a laptop computer, a tablet computer, a smartphone), and so on.

In some embodiments, data source 1202 can include a processor 1322, one or more input(s) 1324, one or more communications systems 1326, and/or memory 1328. In some embodiments, processor 1322 can be any suitable hardware processor or combination of processors, such as a CPU, a GPU, and so on. In some embodiments, the one or more input(s) 1324 are generally configured to acquire data, images, or both, and can include an x-ray fluoroscopy system, a CT system, an MRI system, or so on. Additionally or alternatively, in some embodiments, one or more input(s) 1324 can include any suitable hardware, firmware, and/or software for coupling to and/or controlling operations of an x-ray fluoroscopy system, a CT system, an MRI system, or so on. In some embodiments, one or more portions of the one or more input(s) 1324 can be removable and/or replaceable.

Note that, although not shown, data source 1202 can include any suitable inputs and/or outputs. For example, data source 1202 can include input devices and/or sensors that can be used to receive user input, such as a keyboard, a mouse, a touchscreen, a microphone, a trackpad, a trackball, and so on. As another example, data source 1202 can include any suitable display devices, such as a computer monitor, a touchscreen, a television, etc., one or more speakers, and so on.

In some embodiments, communications systems 1326 can include any suitable hardware, firmware, and/or software for communicating information to computing device 1250 (and, in some embodiments, over communication network 1254 and/or any other suitable communication networks). For example, communications systems 1326 can include one or more transceivers, one or more communication chips and/or chip sets, and so on. In a more particular example, communications systems 1326 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1328 can include any suitable storage device or devices that can be used to store instructions, values, data, or the like, that can be used, for example, by processor 1322 to control the one or more input(s) 1324, and/or receive data from the one or more input(s) 1324; to images from data; present content (e.g., images, a user interface) using a display; communicate with one or more computing devices 1250; and so on. Memory 1328 can include any suitable volatile memory, non-volatile memory, storage, or any suitable combination thereof. For example, memory 1328 can include RAM, ROM, EEPROM, one or more flash drives, one or more hard disks, one or more solid state drives, one or more optical drives, and so on. In some embodiments, memory 1328 can have encoded thereon, or otherwise stored therein, a program for controlling operation of data source 1202. In such embodiments, processor 1322 can execute at least a portion of the program to generate images, transmit information and/or content (e.g., data, images) to one or more computing devices 1250, receive information and/or content from one or more computing devices 1250, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for analyzing flow through a tubular organ of a subject, the method comprising:

(a) accessing medical image data acquired from the subject, the medical image data depicting transport of a bolus through a tubular organ of the subject;
   (b) generating segmented medical image data by segmenting the medical image data in order to segment the bolus as it is transported through the tubular organ of the subject;
   (c) generating flow analysis data by inputting the segmented medical image data to a reduced-order model, generating output as the flow analysis data, wherein the flow analysis data comprise at least one of fluid flow rate data, pressure field data, wall stiffness data, or relaxation data, each determined during bolus transport through the tubular organ of the subject.

2. The method of claim 1, wherein generating the segmented medical image data comprises inputting the medical image data to a trained machine learning algorithm, generating output as the segmented medical image data, wherein the trained machine learning algorithm has been trained on training data to identify and segment a bolus from background image data.

3. The method of claim 2, wherein the trained machine learning algorithm implements an artificial neural network.

4. The method of claim 3, wherein the artificial neural network is a convolutional neural network.

5. The method of claim 4, wherein the convolutional neural network implements a TernausNet architecture.

6. The method of claim 2, wherein the trained machine learning algorithm is trained on the training data using a combination of binary cross-entropy and intersection over union loss functions.

7. The method of claim 1, wherein the reduced-order model comprises a one-dimensional fluid mechanics-based model.

8. The method of claim 7, wherein the one-dimensional fluid mechanics-based model implements one-dimensional continuity and Navier-Stokes equations.

9. The method of claim 7, wherein the tubular organ is an esophagus and the reduced-order model implements a boundary condition that is dependent on functioning of an esophageal sphincter.

10. The method of claim 9, wherein the boundary condition assigns an initial flow value at the esophageal sphincter.

11. The method of claim 9, wherein the boundary condition assigns an initial pressure value at the esophageal sphincter.

12. The method of claim 9, wherein the esophageal sphincter is one of an upper esophageal sphincter or a lower esophageal sphincter.

13. The method of claim 1, wherein the segmented medical image data include cross-section areas of the tubular organ computed from the segmented bolus, and the cross-section areas are input to the reduced-order model.

14. The method of claim 13, wherein the cross-section areas are computed assuming a circular cross-section of the tubular organ.

15. The method of claim 14, wherein the cross-section areas are scaled to an elliptical shape based on a volume of the bolus.

16. The method of claim 1, wherein the medical image data comprise fluoroscopy images.

17. The method of claim 1, wherein the tubular organ is an esophagus.

18. The method of claim 17, wherein the bolus is a bolus of barium.

19. The method of claim 1, wherein the tubular organ is an esophagus and further comprising generating a report that quantifies behavior of a lower esophageal sphincter in terms of flow rate data and pressure field data output from the reduced-order model.

* * * * *